Sept. 15, 1931. A. D. DOWD ET AL 1,823,354
HIGH SPEED SUBMARINE CABLE TELEGRAPH SYSTEM
Filed Aug. 19, 1929 21 Sheets-Sheet 1

INVENTORS
A. D. DOWD
M. B. KERR
G. A. LOCKE
BY
ATTORNEY

Fig. 13.

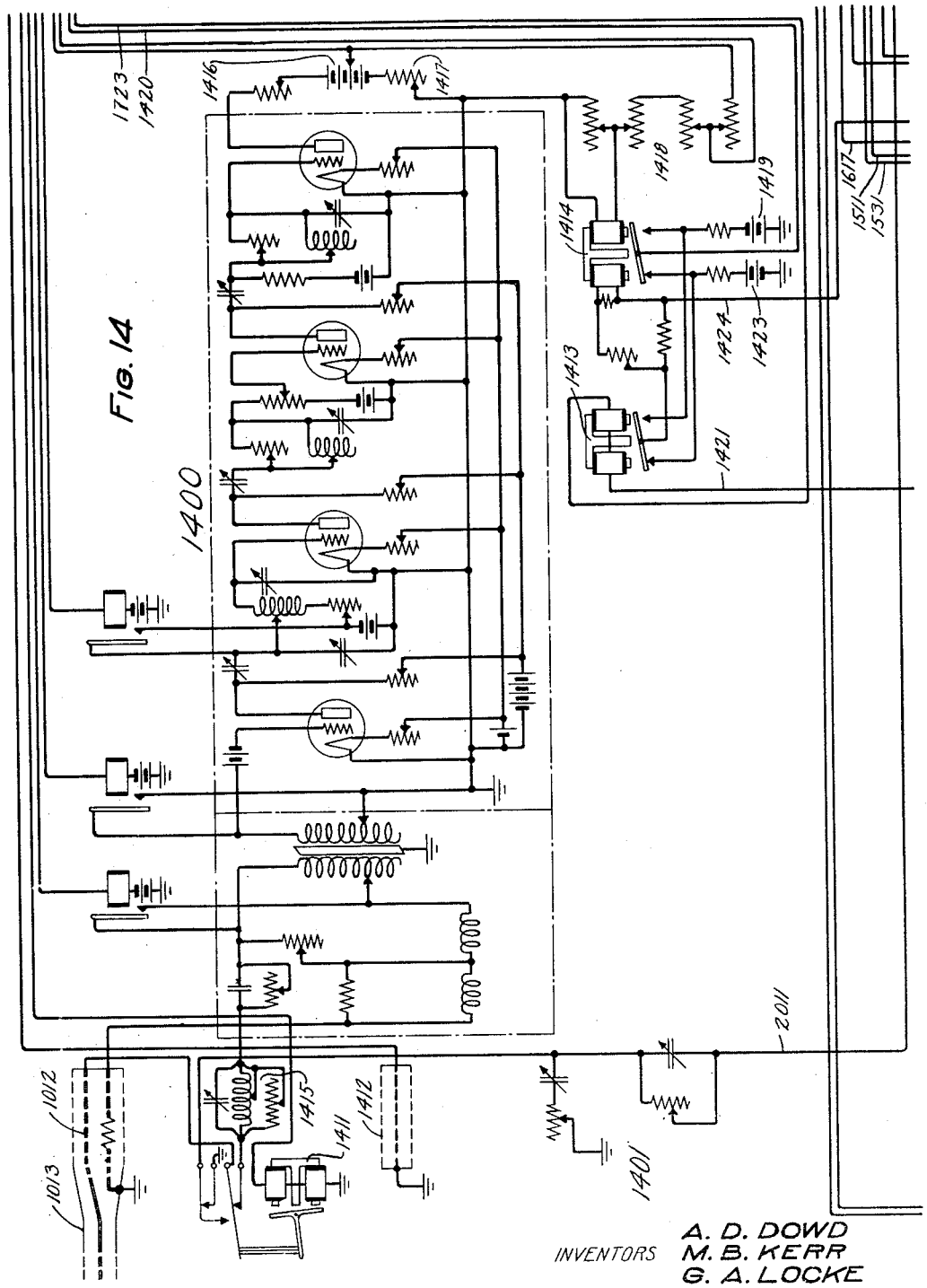

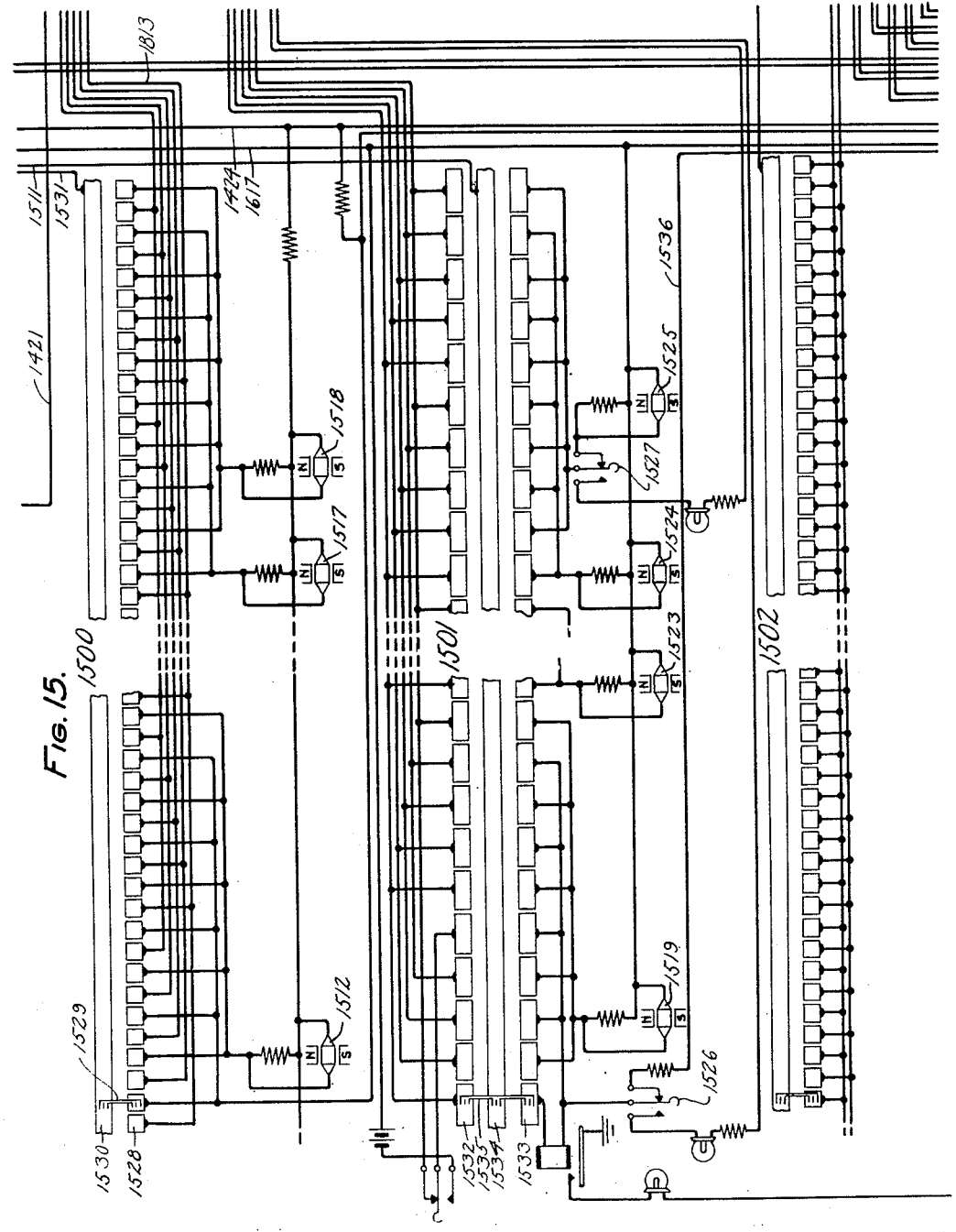

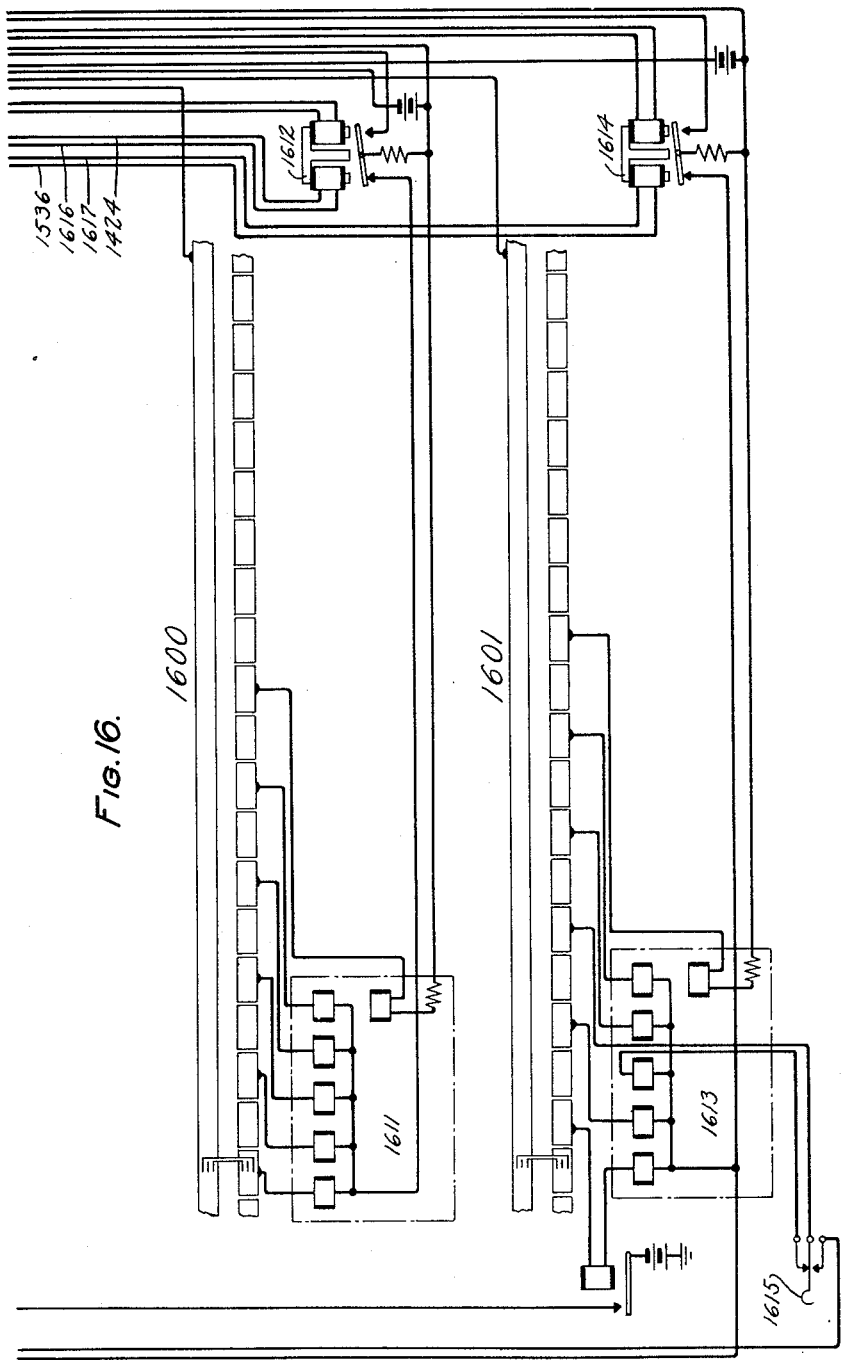

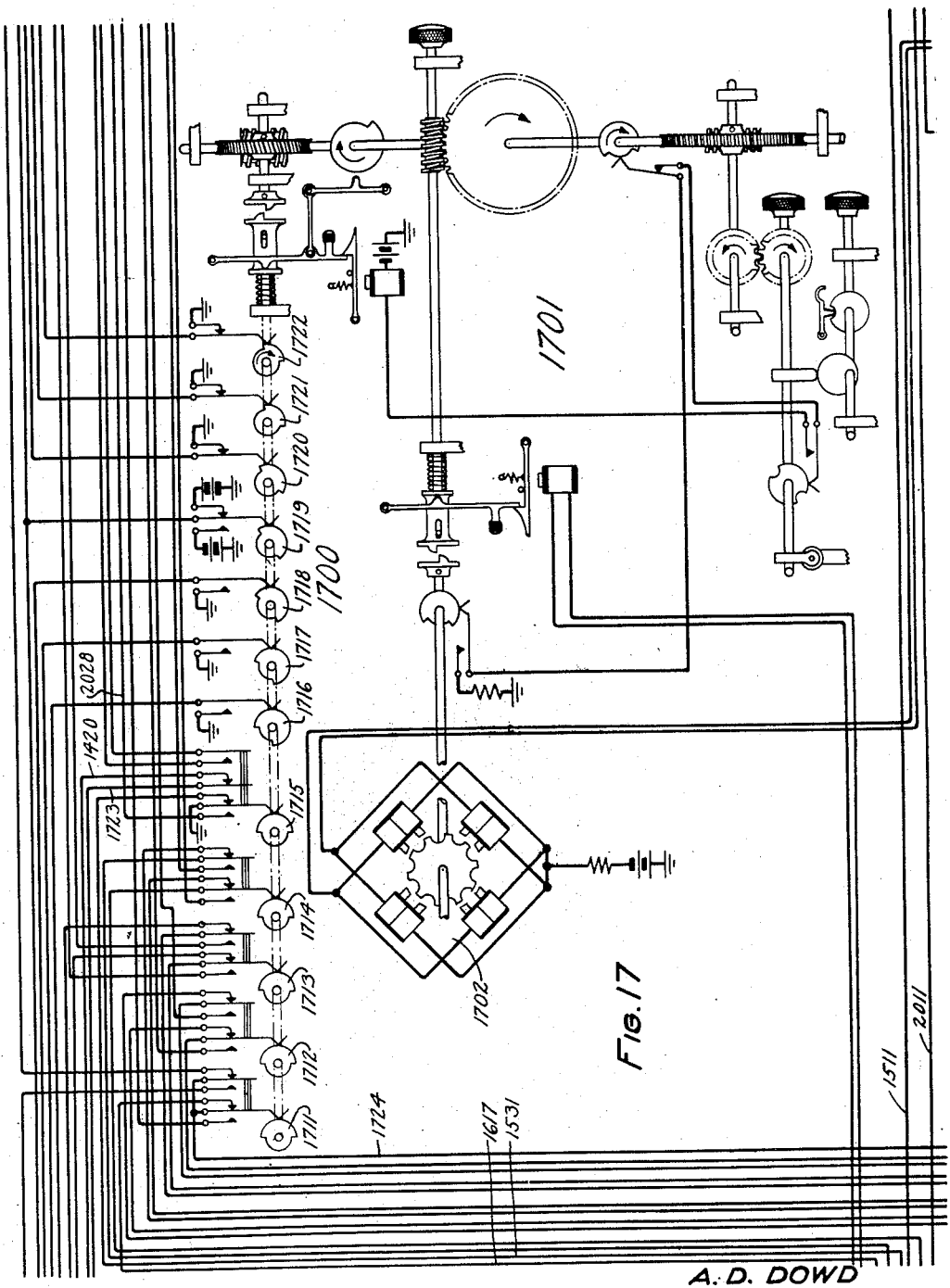

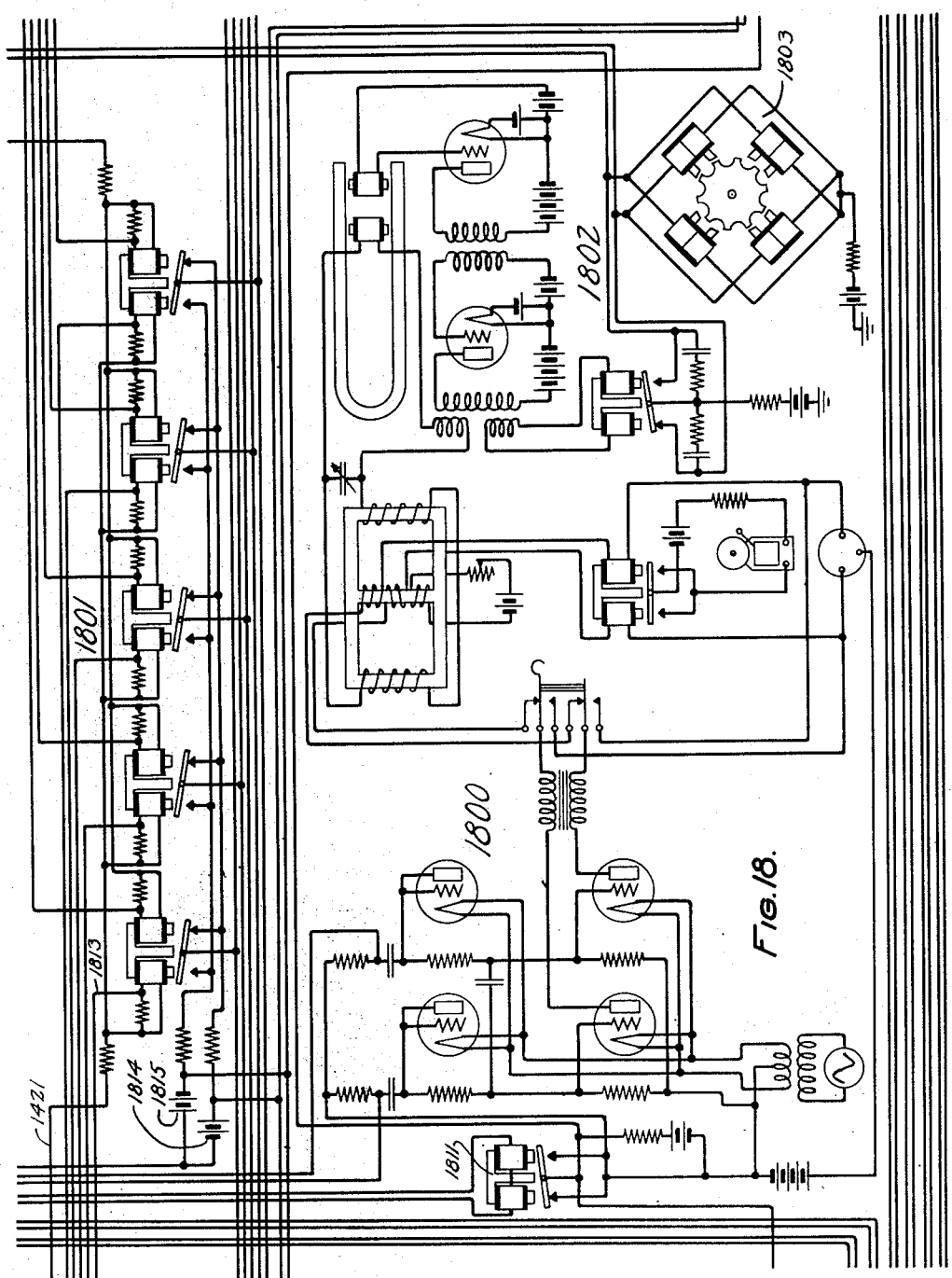

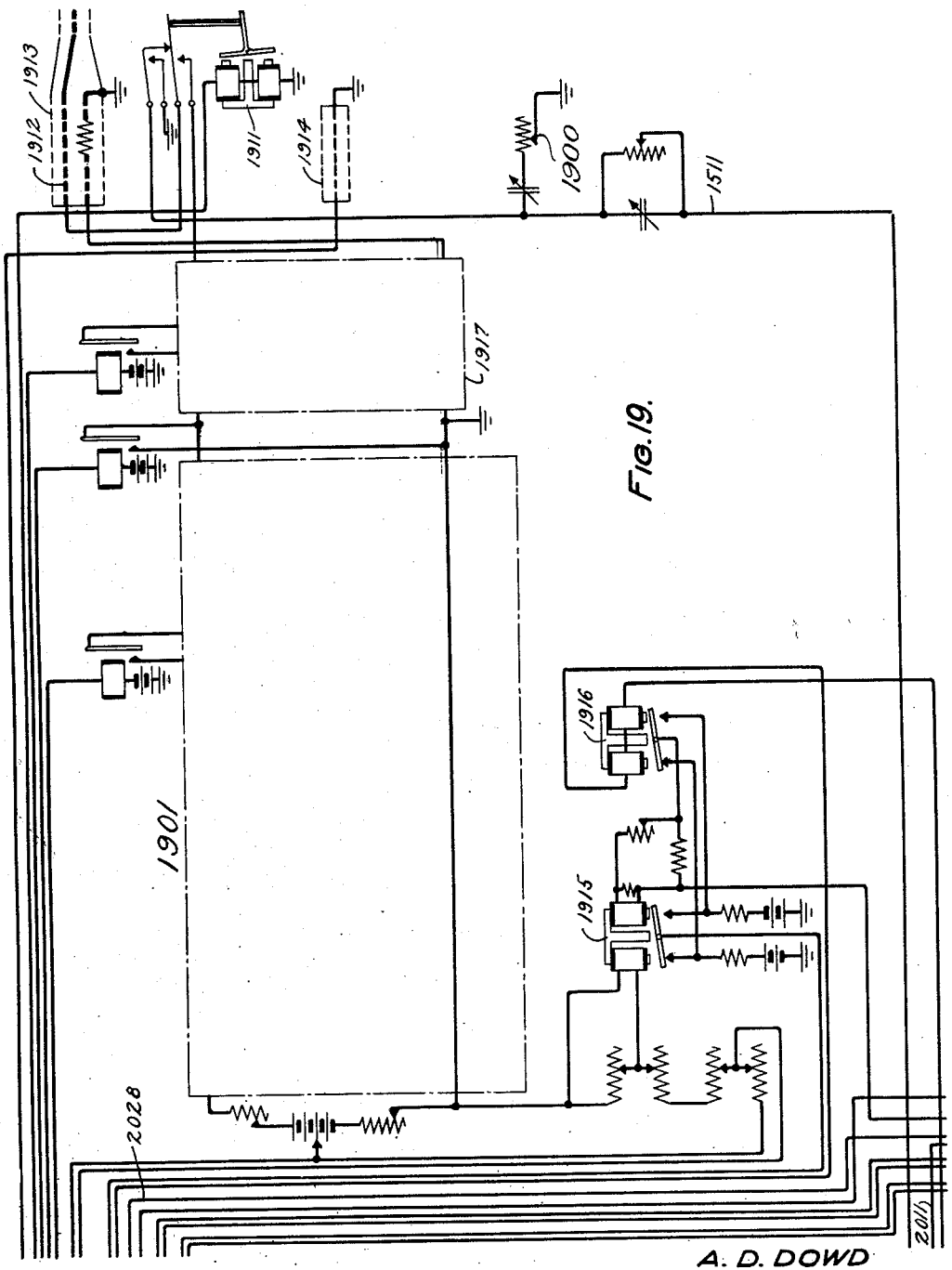

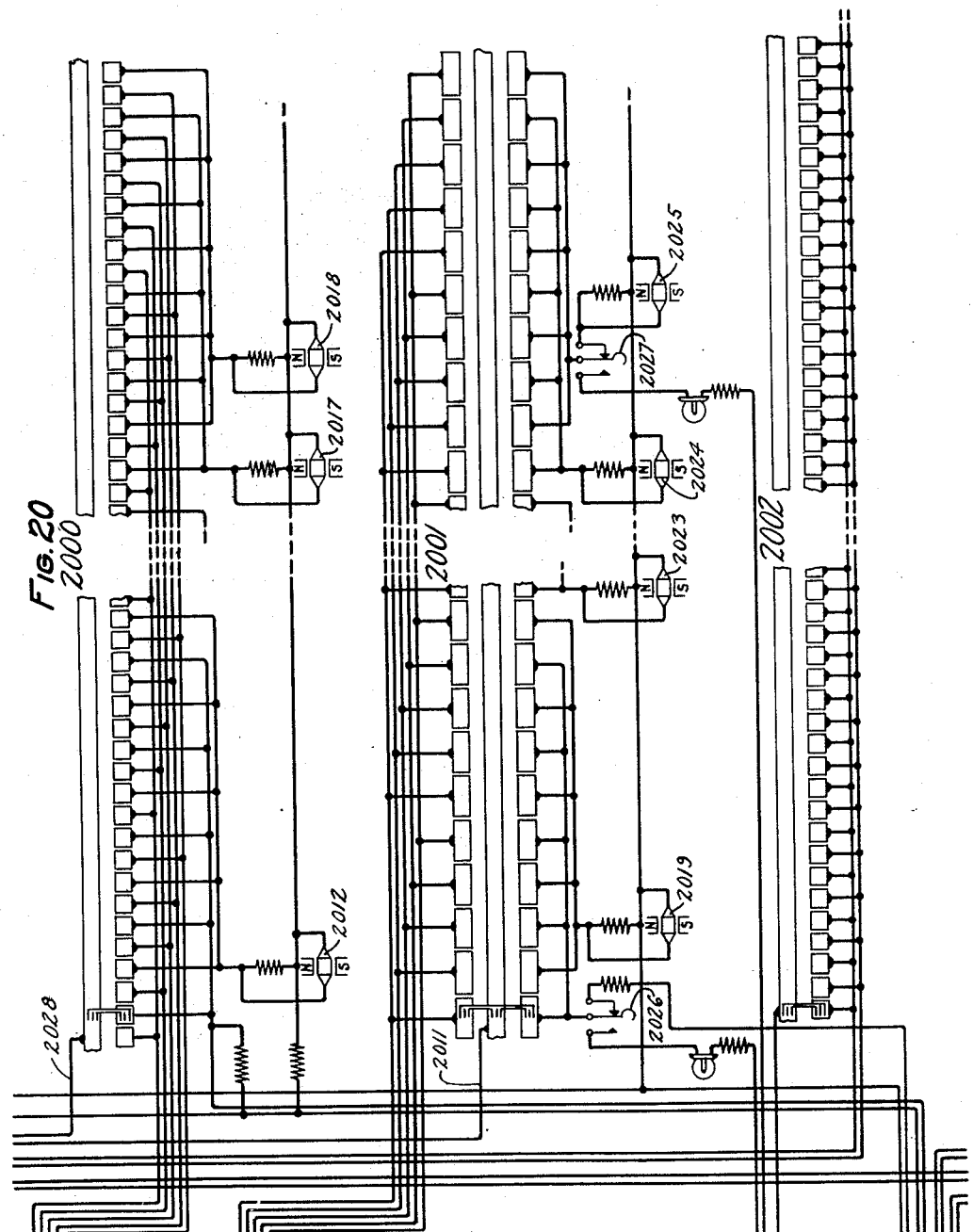

Sept. 15, 1931. A. D. DOWD ET AL 1,823,354
HIGH SPEED SUBMARINE CABLE TELEGRAPH SYSTEM
Filed Aug. 19, 1929 21 Sheets-Sheet 21
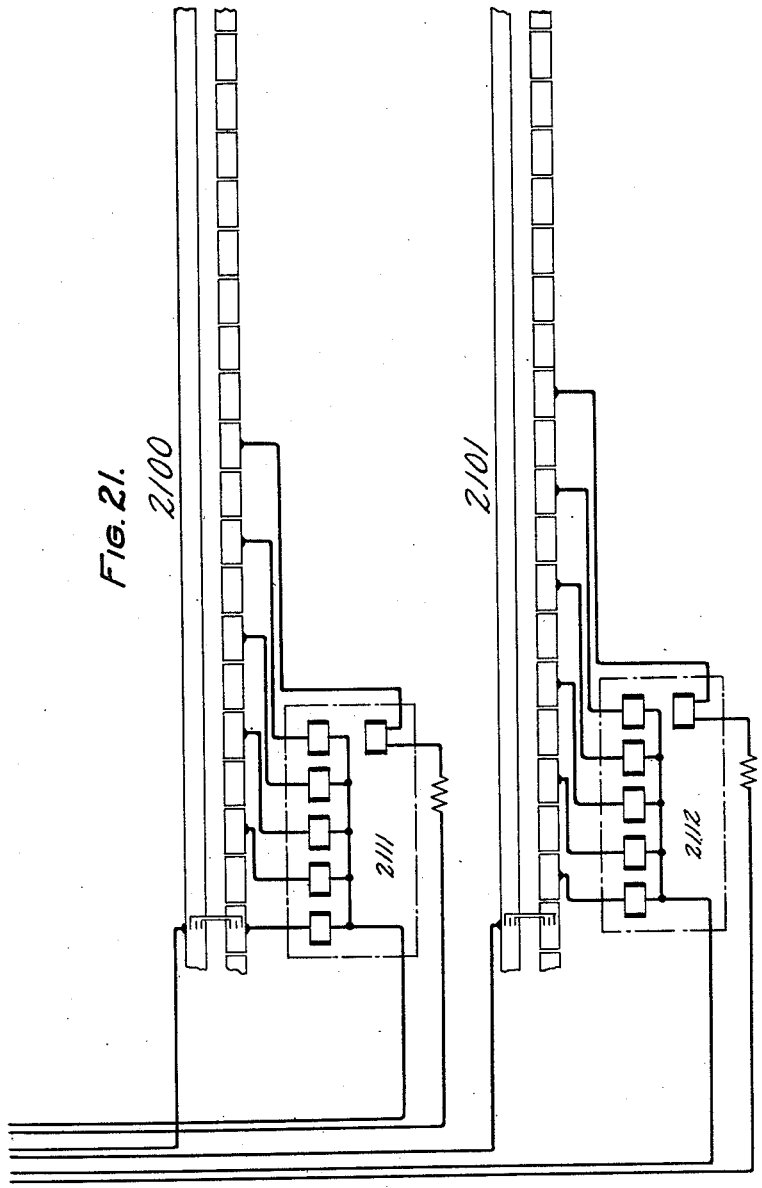
INVENTORS A. D. DOWD
M. B. KERR
G. A. LOCKE
BY
ATTORNEY Patented Sept. 15, 1931

1,823,354

UNITED STATES PATENT OFFICE

ANDREW D. DOWD, OF HOBOKEN, NEW JERSEY, AND MARK B. KERR, OF ROSEBANK, STATEN ISLAND, AND GEORGE A. LOCKE, OF GLEN COVE, NEW YORK, ASSIGNORS TO BELL TELEPHONE LABORATORIES, INCORPORATED, OF NEW YORK, N. Y., A CORPORATION OF NEW YORK

HIGH SPEED SUBMARINE CABLE TELEGRAPH SYSTEM

Application filed August 19, 1929. Serial No. 386,967.

This invention relates to signaling systems and more particularly to loaded submarine cable telegraph systems.

The broad object of this invention is to improve the operation of a signaling system of the type adapted for use with submarine cables and a more specific object is to increase the speed at which messages may be transmitted over several sections, in series, of a long loaded submarine telegraph cable.

Another object is to adapt low speed operating devices to a high speed signaling system whereby a plurality of low speed transmission lines may be connected to both ends of a high speed transmission line so as to take full advantage of the high speed character of a loaded submarine telegraph cable.

Still another object is to repeat messages transmitted in opposite directions over common equipment.

A further object is to overcome the difficulties inherent in the difference of speeds between low speed and high speed operating devices, respectively located at the terminals and repeating points of a signaling system.

Another object is to repeat messages at high speed in opposite directions by means of a single rotary distributor and a common set of relays.

Another object is to synchronize the rotary distributors at the repeating points of a submarine cable by continuously operated electrical means whereby very slight departures from synchronism with the incoming signals are quickly corrected.

Another object is to reduce to a minimum the diameters of the rotary distributor faces required for high speed submarine cable telegraph systems thereby reducing correspondingly the wear on the brushes and also to reduce the motor power required to operate the distributor.

The development of highly permeable magnetic materials for long submarine telegraph cables has made it possible to provide a long submarine cable having electrical characteristics which permit signaling thereover at considerably greater speed than heretofore used on cables of equal length. However, at the higher ranges of operating speeds, the duplexing of such cables presents difficulties which have been avoided by adapting the simplex or one-way method of transmission with periodic reversals of the direction of transmission. This method was employed in the systems which are disclosed in U. S. Patents 1,689,328 and 1,799,217, respectively, granted to A. M. Curtis on October 30, 1928 and to A. A. Clokey on April 7, 1931. The apparatus disclosed in the Patent 1,619,328 is arranged for five-channel operation and is capable of operating satisfactorily at a speed slightly in excess of 1600 characters per minute and that disclosed in Patent 1,799,- 214 is arranged for eight-channel operation and is capable of operating satisfactorily at a speed slightly in excess of 2400 characters per minute.

In the complete system herein described and illustrated in the accompanying drawings, five stations are employed, two terminal stations and three relay or repeating stations. The submarine cable consists of two sections which are interconnected at one repeating station. The two other repeating stations are located at opposite ends of the cable. The use of these repeating stations at opposite ends of the cable is desirable since the terminal stations of the complete system are located at a considerable distance from the landing places of the submarine cable. For transmission in one direction, say from west to east, the arrangement briefly is as follows: Two sets of four tape-controlled transmitters are respectively associated through two four-channel rotary distributor faces, referred to herein as quad distributors, with two duplex lines leading to a repeating station at one end of the submarine cable. The transmitters of each set are successively connected to their respective duplex lines, both lines operating simultaneously. The transmitted signals on each duplex line are received in a polar relay at the repeater station and repeated thereby over a common rotary distributor to a set of five storing relays of the polarized type common to both sets of transmitters. The rotary distributor face at this point has two pairs of receiving rings each pair arranged for receiving signals over four-channels, the segmented rings each having ten segments for each channel. The alternate segments of each ring are connected to the armature of a receiving relay and are referred to herein as the live segments. The live segments on one ring are staggered with respect to the live segments of the other ring thereby furnishing an arrangement whereby the five storing relays, alternately connected to successive live segments of both rings, are successively operated by signals received over the two duplex lines and therefore repeat the impulses of one line interleaved with the impulses of the other over another rotary distributor face arranged to transmit over eight-channels to the first section of the submarine cable. At the opposite end of the first section of submarine cable the impulses are received in a vacuum tube amplifier wherein they are amplified and transmitted to an eight-channel distributor whereof the receiving rings operate in conjunction with a pair of vibrating relays to repeat the impulses received from the first section of cable and to interpolate those impulses which may be lost during transmission. The vibrating relay circuit repeats the impulses as originally transmitted to another set of five storing relays which in turn repeat the signals over a set of eight-channel sending rings on a second rotary distributor face at this station to a second section of the cable. At the end of the second section of the cable the signals are received as described above, but the impulses repeated by the storing relays instead of being repeated to the eight-channel sending rings are alternately repeated over two four-channel sending rings of a second distributor face to operate two sending-on relays respectively associated with the four-channel sending ring sets. The two sending-on relays respectively repeat their signals over two other duplex lines to the other terminal station of the system. Here the impulses received over each duplex line, operate a polar relay which repeats the impulses through a four-channel or quad distributor to a set of four printers.

After transmitting for a predetermined time a series of contacts operated by timing devices at each of the repeating stations are closed to thereby set in motion means for automatically reversing the direction of transmission. Time operated devices are provided at the repeating stations, but the switching at the west and east terminal stations is effected by means of pilot lines and operated by the time operated devices at the repeating stations at the east and west ends respectively, of the cable. The arrangement of apparatus and transmission from east to west is identical with that described above for west to east transmission, and therefore only the equipment for the west terminal, the west repeater and the intermediate repeater stations are shown and described in detail.

A clearer understanding of the invention will be gained from a consideration of the following detailed description together with the appended drawings in which in general Figs. 1 and 2 show a schematic diagram of the complete system which comprises a terminal station WT at the west end of the system; a repeater station WR at the west end of a submarine cable; an intermediate repeater station IR interconnecting the two sections of the cable; a repeater station ER at the east end of the cable; and a terminal station ET at the east end of the system.

Figs. 7, 8, 9, 10, 11, 12 and 13 show the equipment at the west repeater station WR.

Figs. 14, 15, 16, 17, 18, 19, 20 and 21 show the equipment at the intermediate repeater station IR.

Fig. 22 shows the arrangement of sheets of Figs. 1 and 2, and

Fig. 23 shows the arrangement of sheets 3 to 21 which constitute the detailed layout of the west half of the system, the east half as stated above being identical with that shown.

Figure 3:
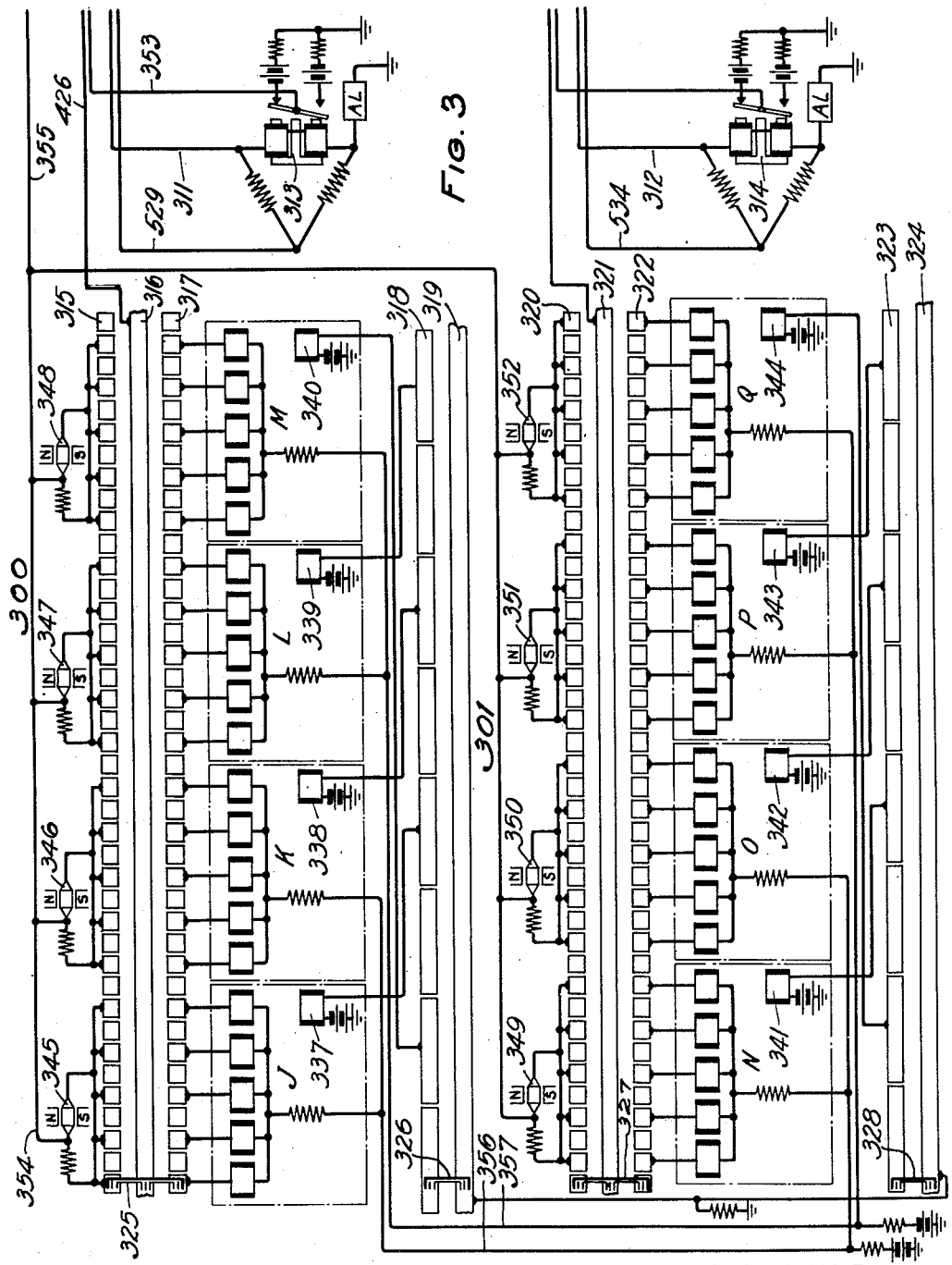
Figs. 3, 4, 5 and 6 show the equipment at the west terminal station WT.

More specifically Fig. 3 shows the receiving rings of two four-channel distributors at station WT together with a schematic showing of two groups of receiving printers and monitoring oscillographs arranged to receive signals from the two duplex lines when the system is in position for east-west transmission.

Figure 4:
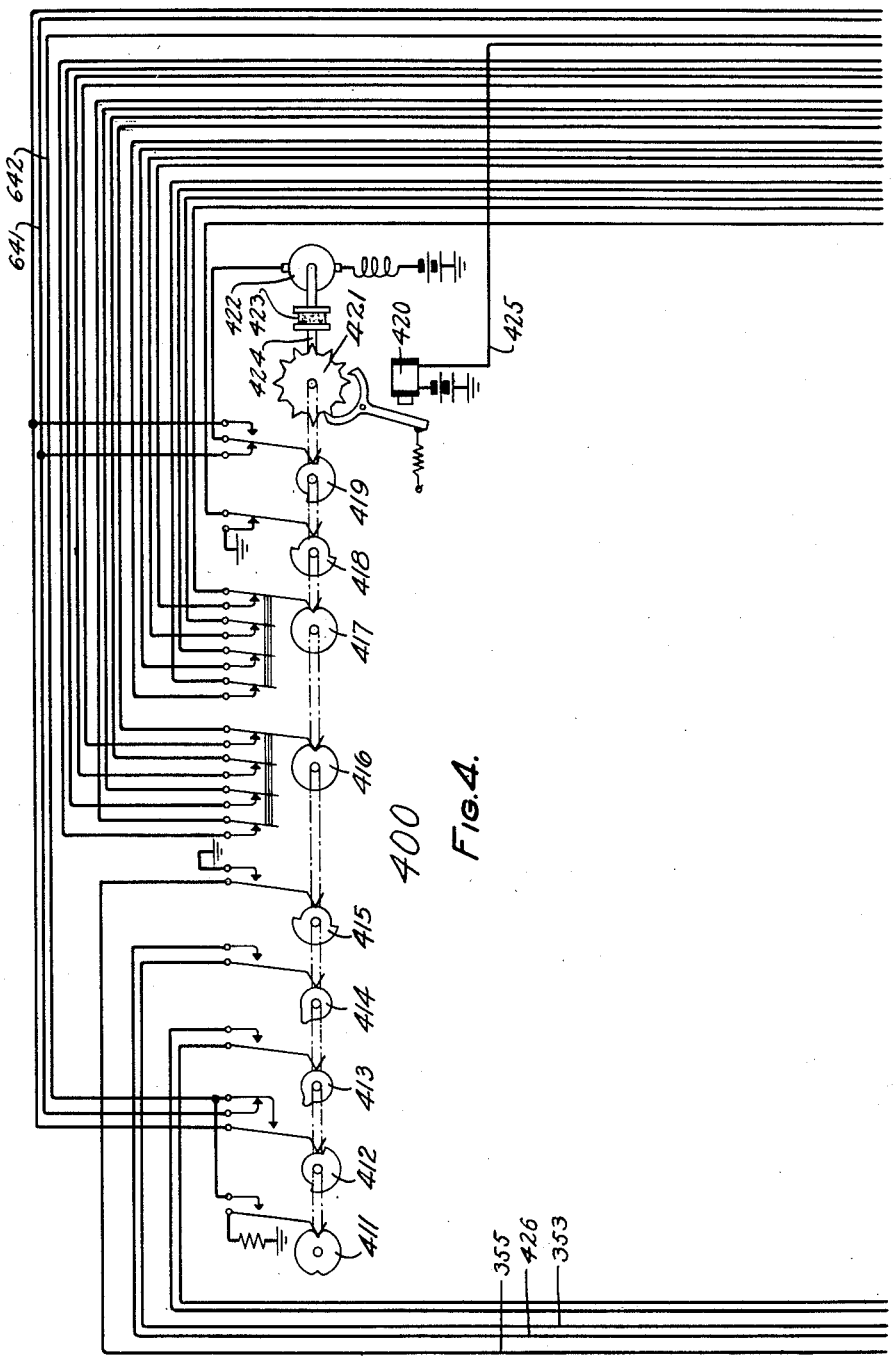

Fig. 4 shows the switching mechanisms at station WT for rearranging the circuits when a change is to be made from sending to receiving and vice versa.

Figure 5:
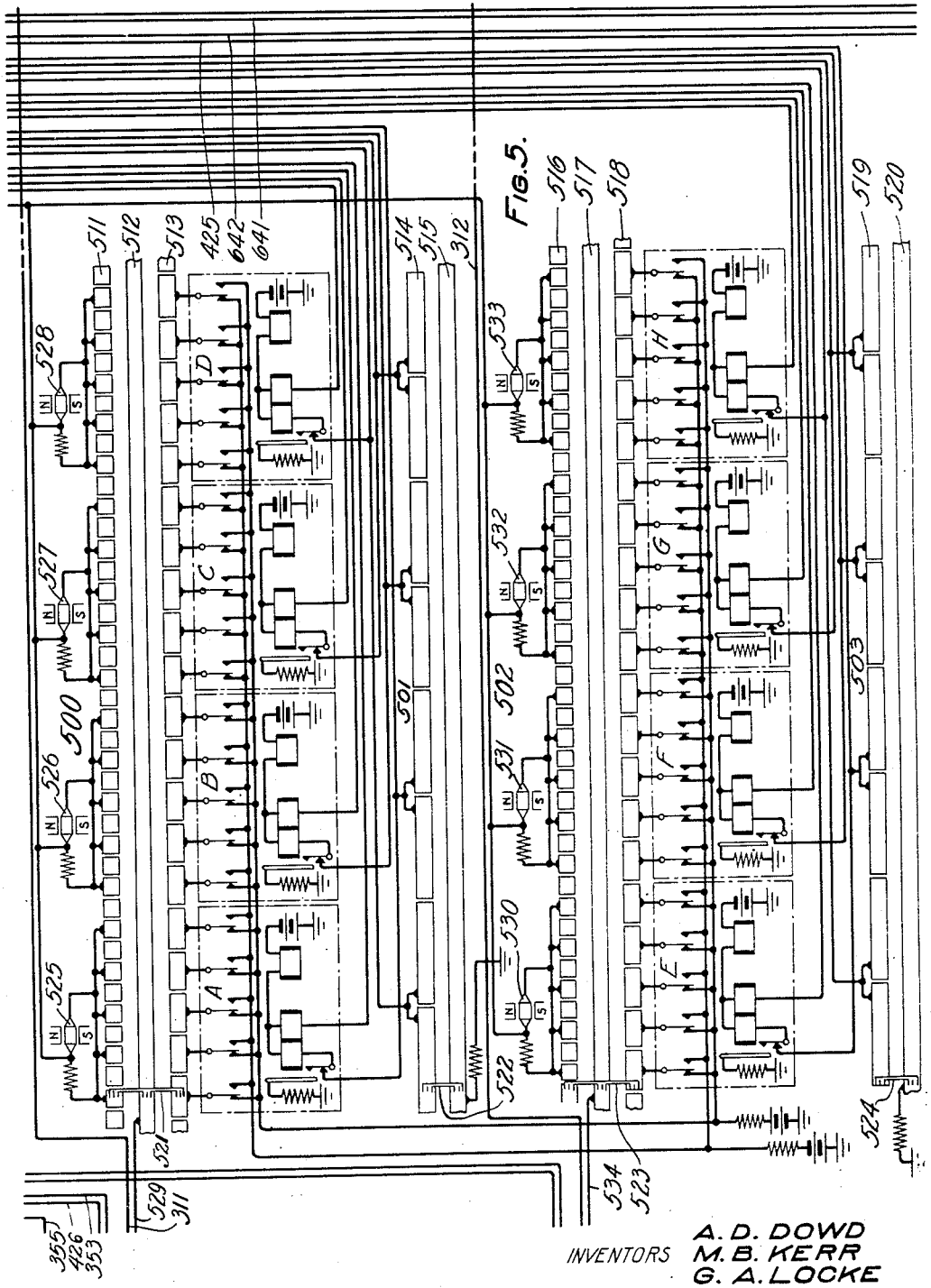

Fig. 5 shows the transmitting rings of the two four-chanel distributors at station WT together with a schematic showing of two sets of transmitters and monitoring oscillographs.

Figure 6:
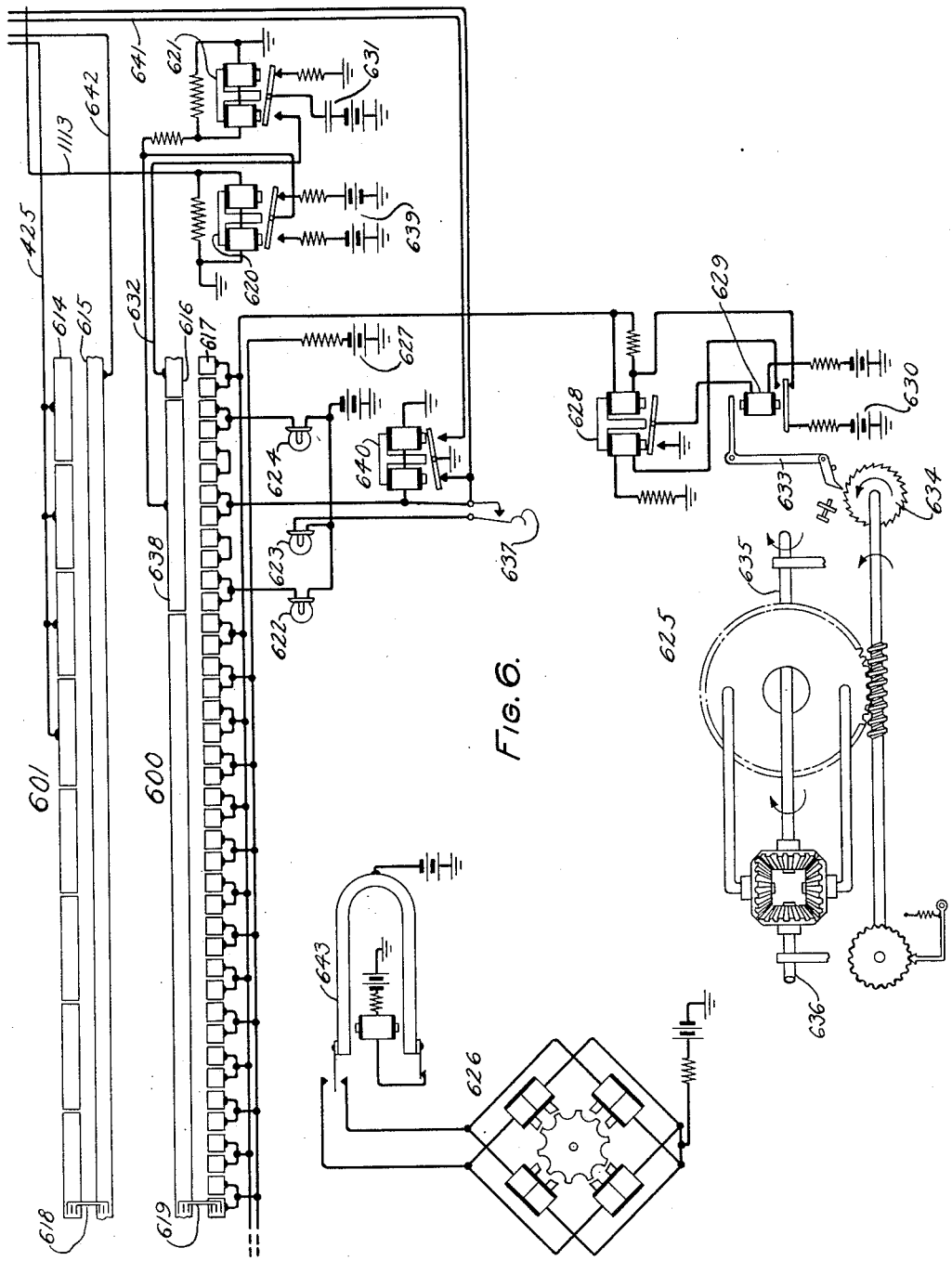

Fig. 6 shows the phonic wheel motor drive and the synchronizing and phasing equipment for the two four-channel distributors at station WT. It will be noted that mechanical correction is employed at this station.

Figure 7:
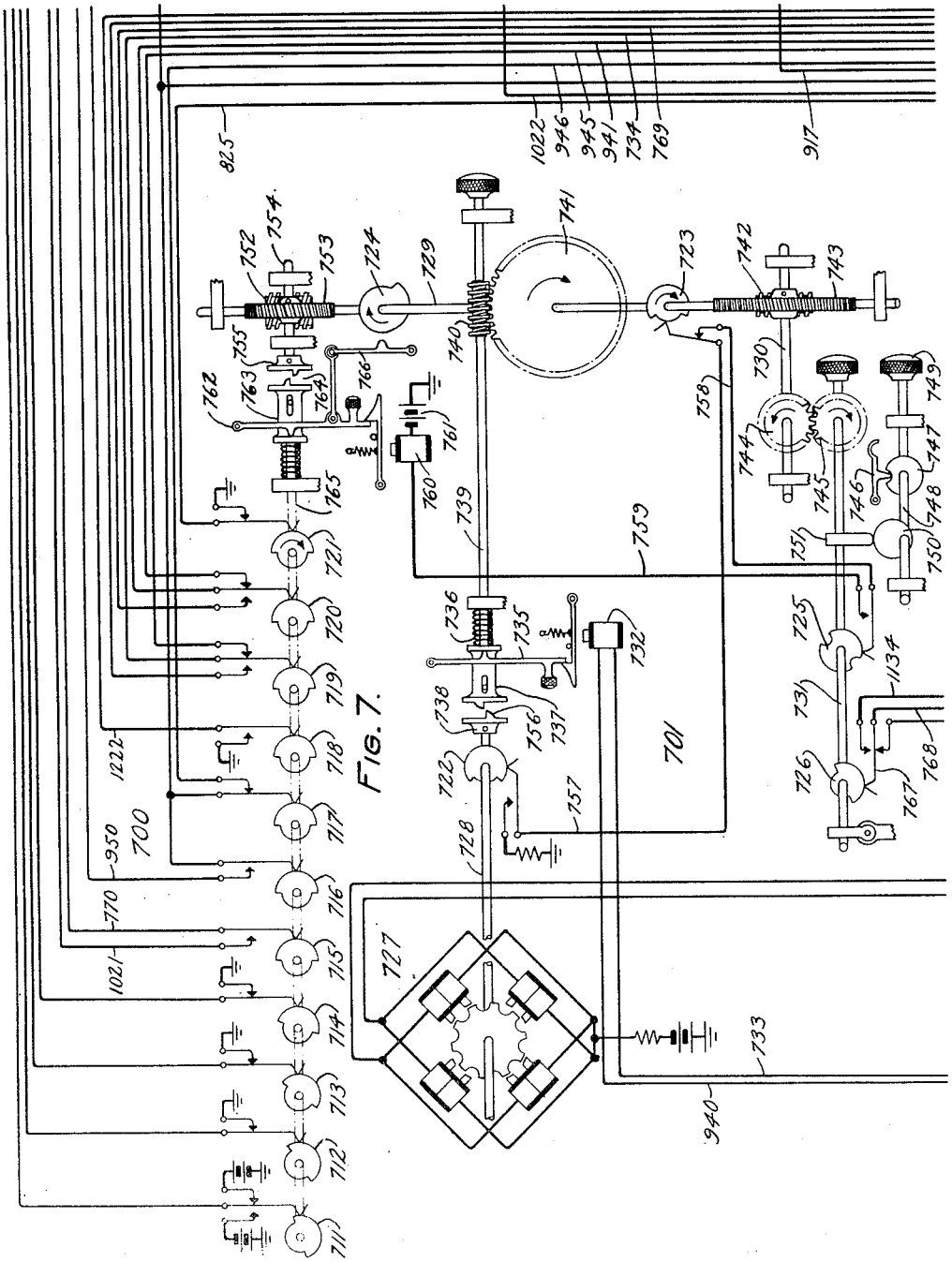

Fig. 7 shows the switch mechanism at station WR together with the timing mechanism and phonic wheel motor for operating both.

Figure 8:
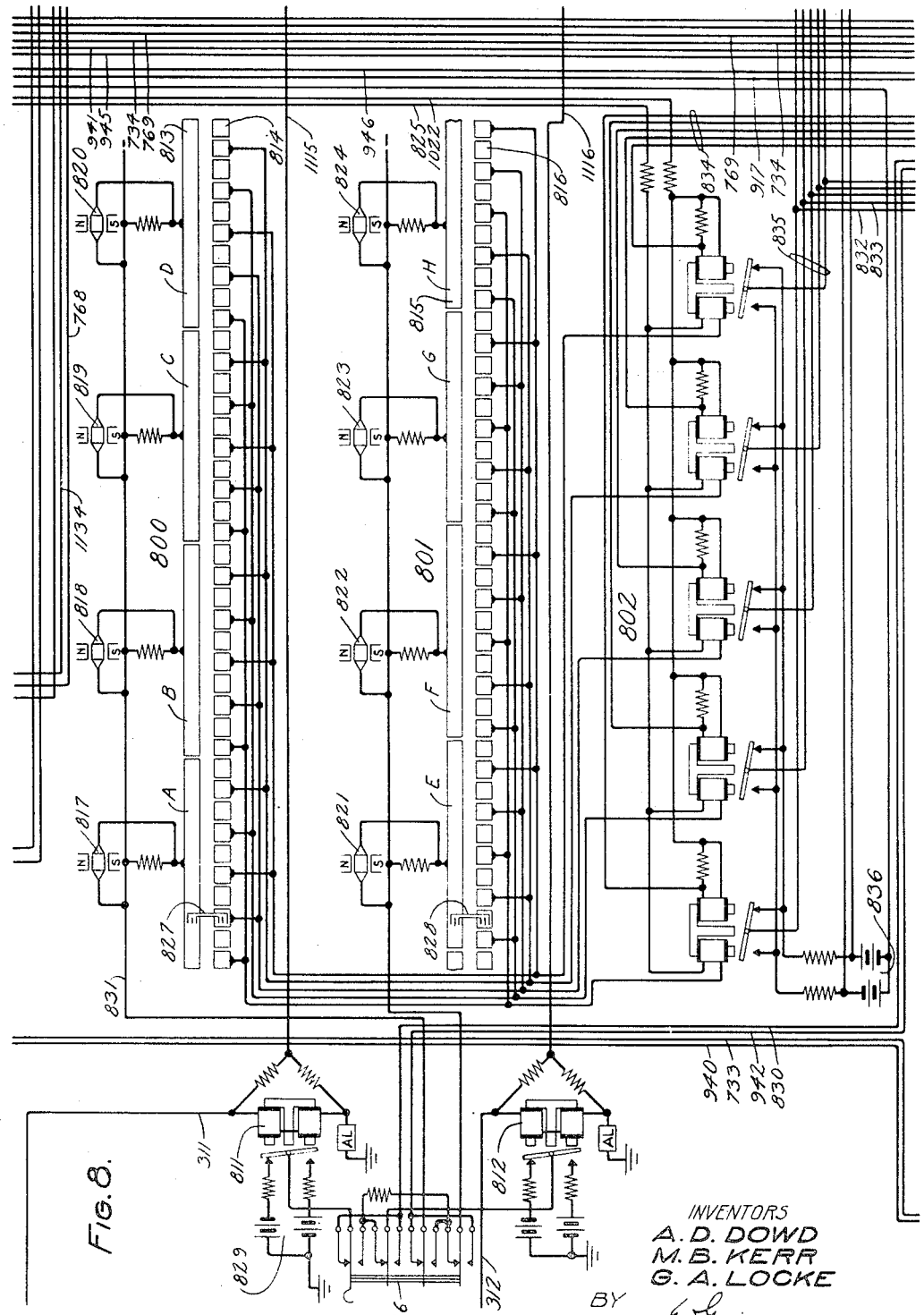

Fig. 8 shows the two duplex lines respectively terminating at station WR in two sets of four-channel receiving rings. Each set is arranged to distribute in continuous sequence the signal impulses incoming over one of the duplex lines to alternate relays of a set of five storing relays so that the relays operate in rotation in response to the impulses received over both lines. Individual monitoring oscillographs are shown connected to each of the four-channels of the receiving rings.

Figure 9:
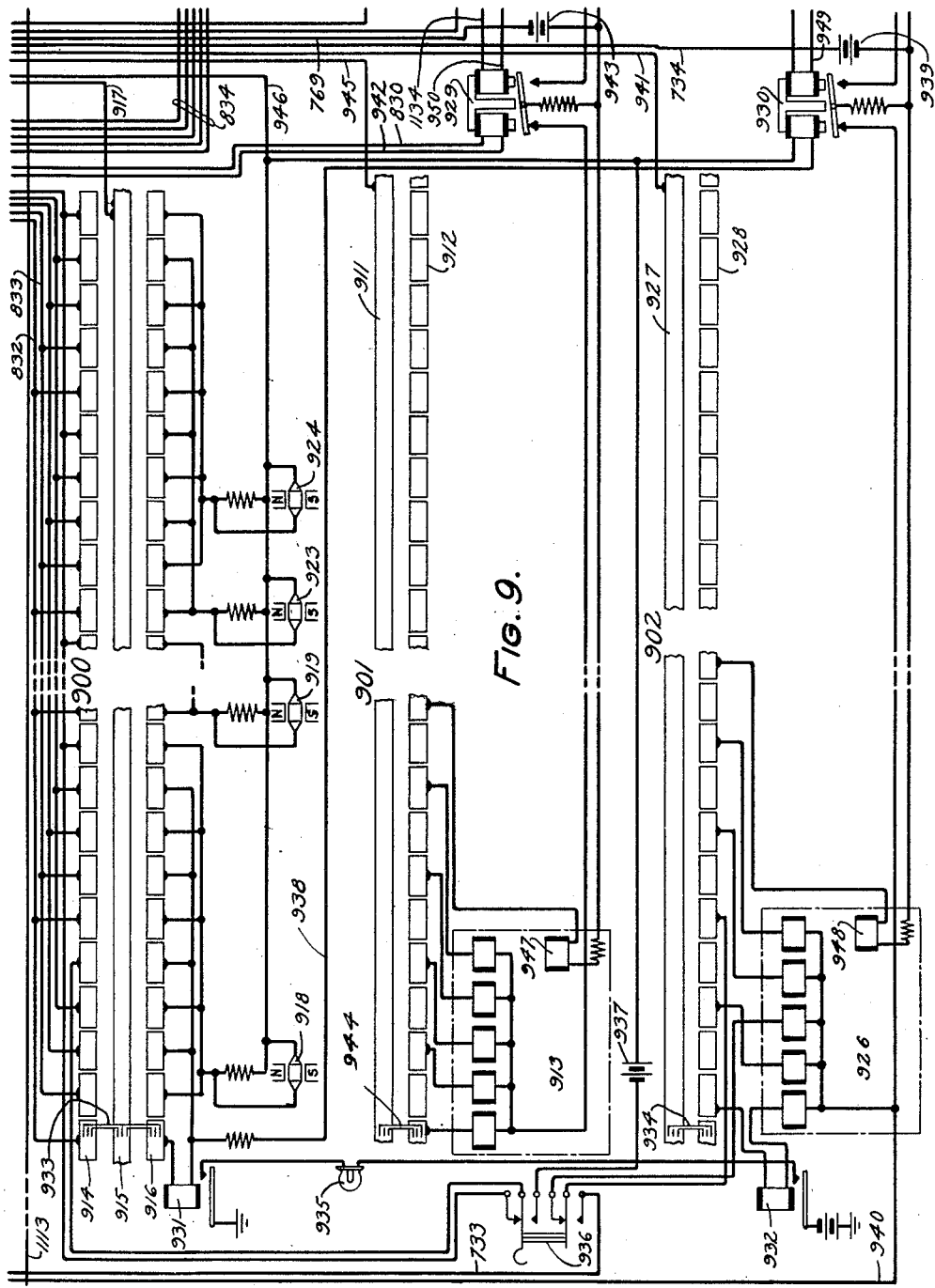

Fig. 9 shows a set of eight-channel sending rings and two pairs of monitoring rings. The monitoring pairs each have connected thereto a printer for monitoring on one channel, one printer serving to monitor signals transmitted to the first cable section and the other serving to monitor signals received from the first cable section. Two monitor relays are shown for respectively operating the monitoring printers. Oscillographs are provided for monitoring the outgoing signals on those channels not monitored by a printer, the oscillographs being individual to the channels.

Figure 10:
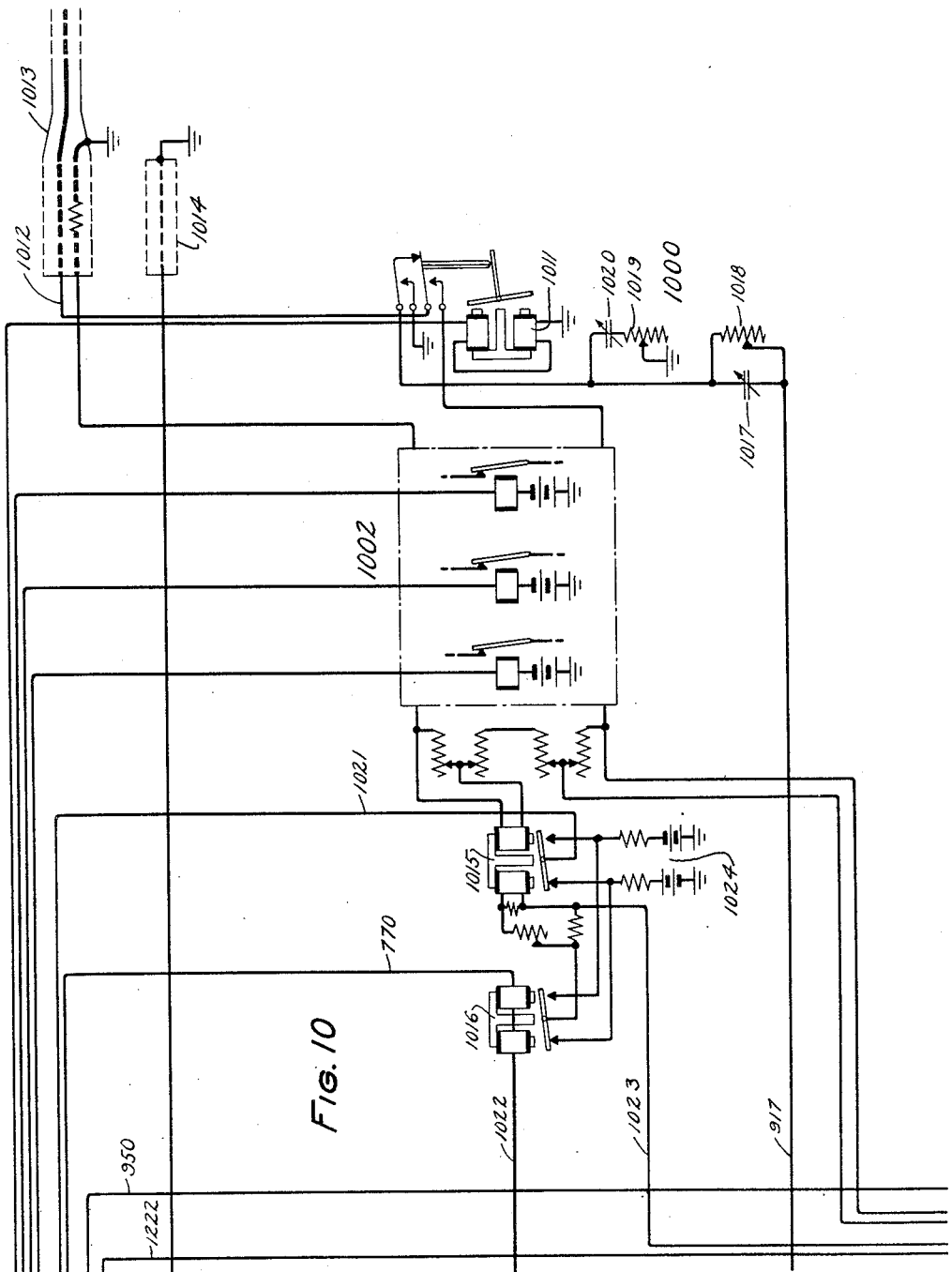

Fig. 10 shows a transfer relay for reversing the connection of the first section of the cable for sending to receiving and vice versa, and a vacuum tube receiving amplifier (diagrammatically shown) and a pair of vibrating relays for receiving signals from the first section of cable. The transfer relay is under control of the switching cams shown in Fig. 7.

Figure 11:
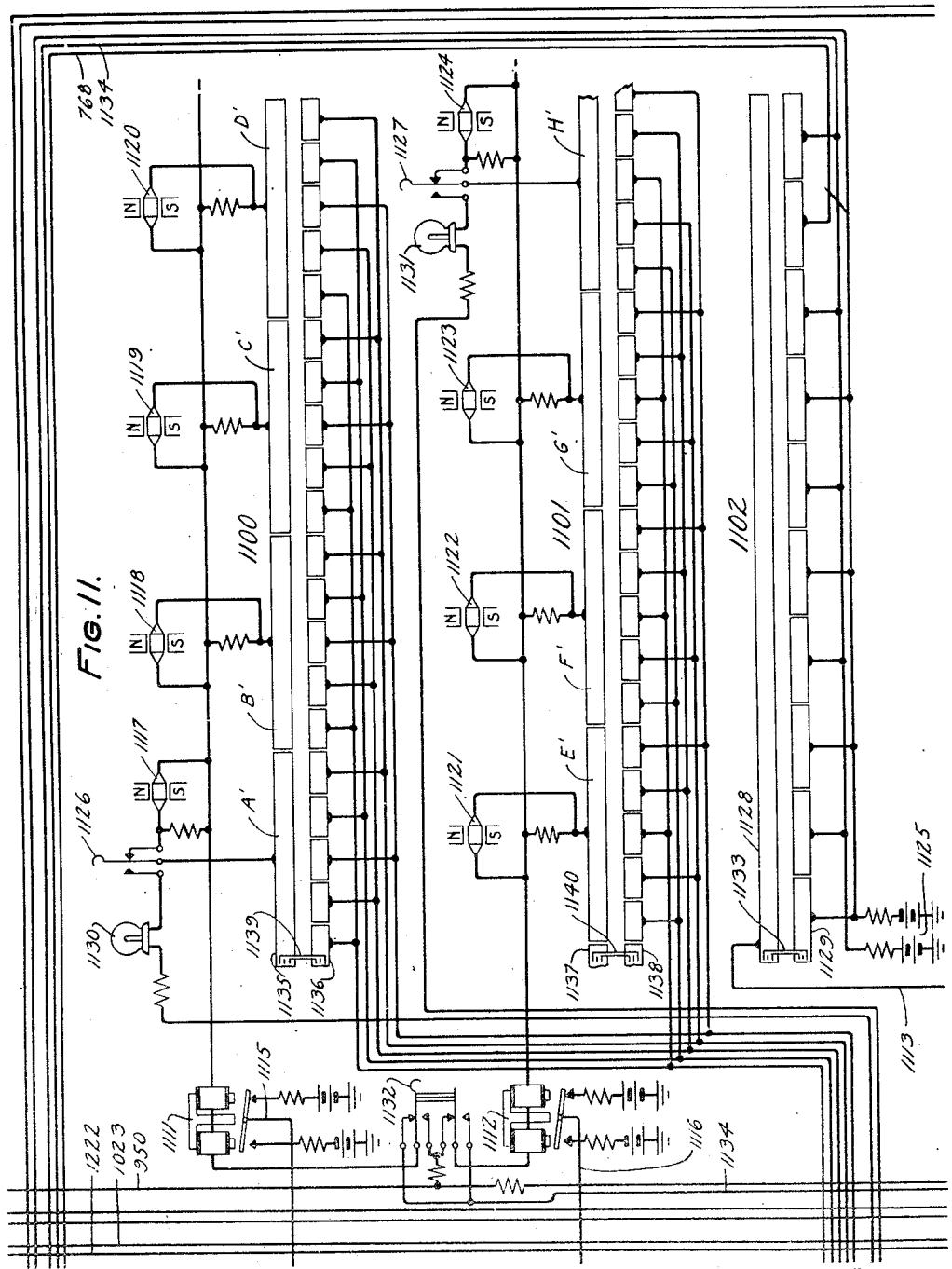

Fig. 11 shows two sets of four-channel sending rings arranged to transmit the signals received from the cable into the two duplex lines respectively and a set of synchronizing rings for transmitting impulses of alternately opposite polarities over a pilot line to the synchronizing and phasing equipment provided at station WT and shown in Fig. 6. Two sending-on relays are shown respectively connected to the two sets of sending rings.

Figure 12:
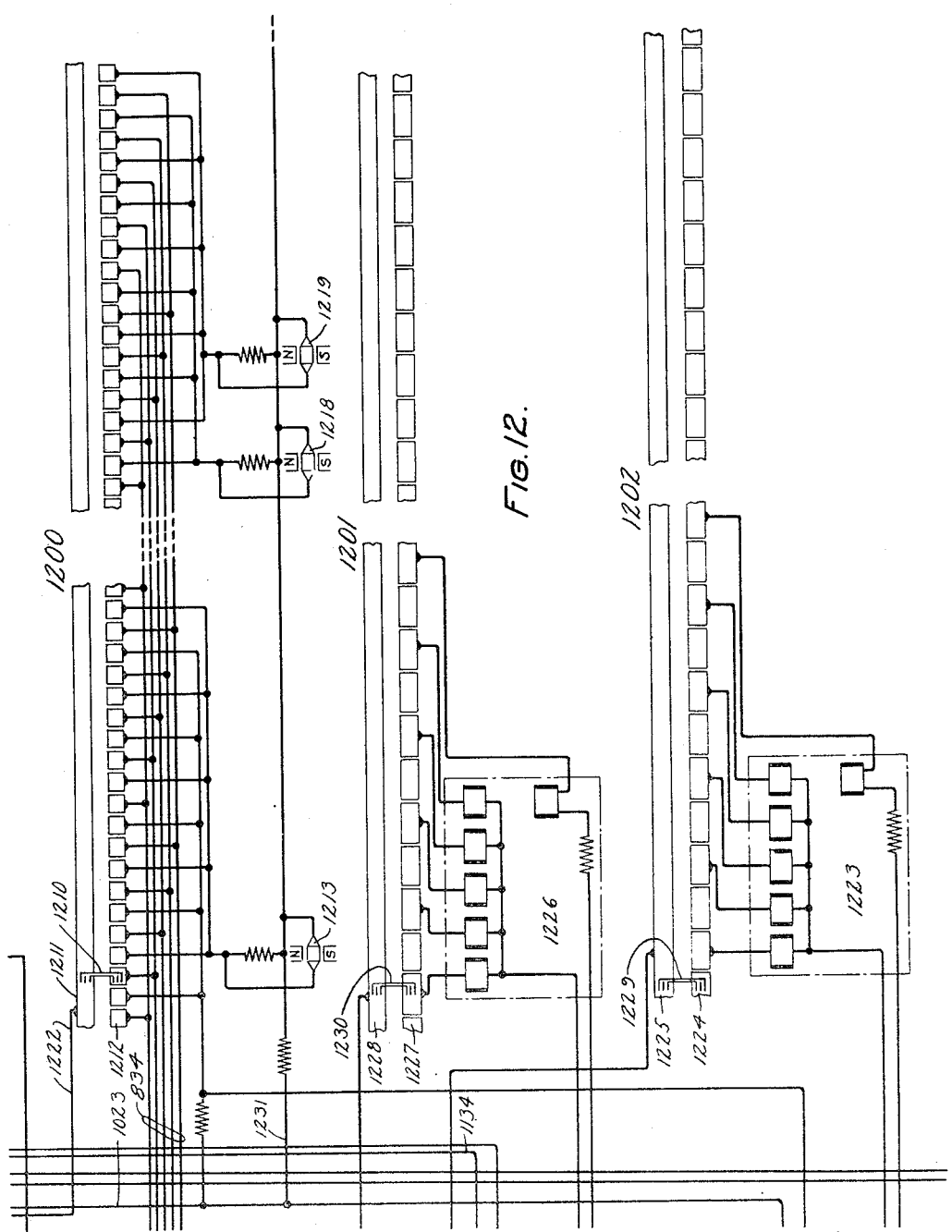

Fig. 12 shows a pair of eight-channel receiving rings and two pairs of eight-channel monitoring rings. The receiving rings are arranged to cooperate with the vibrating relays shown in Fig. 10 to effect the operation of the storing relays shown in Fig. 8 thereby making one set of storing relays common to transmission in both directions. The monitoring rings like those shown in Fig. 9 provide an arrangement whereby a printed record may be obtained on one channel of impulses outgoing over the duplex lines and one channel of impulses incoming over the cable section. Individual oscillographs are provided for the channels of impulses incoming over the cable, other than the channel monitored by a printer.

Figure 13:
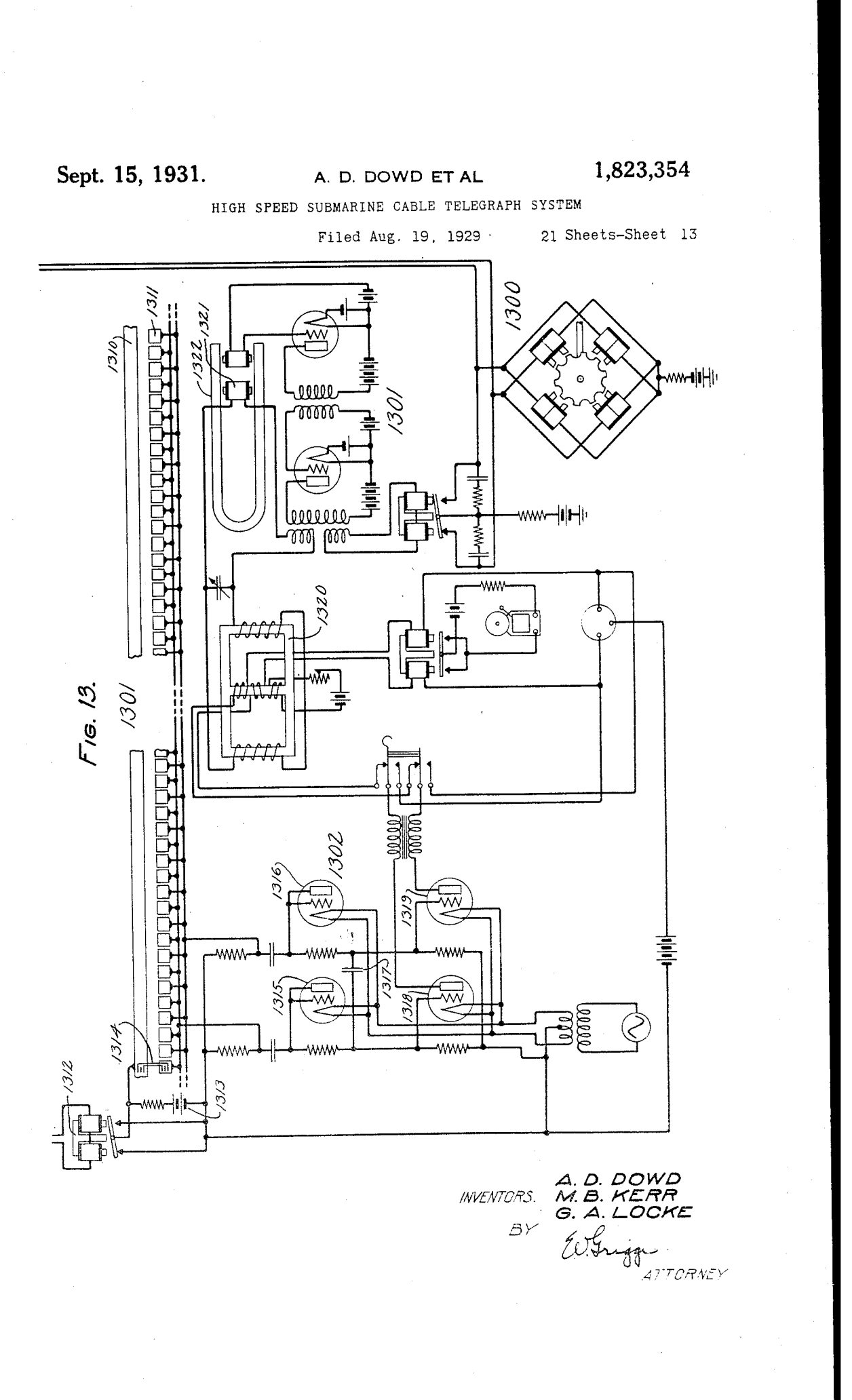

Fig. 13 shows a pair of correcting rings, a vacuum tube correcting circuit, a vacuum tube tuning fork circuit and a phonic wheel motor. The motor serves to drive the distributor heads or faces associated with both the duplex lines and the first section of the cable. The correction arrangement shown in this figure is referred to herein as a continuous electrical correction circuit.

Fig. 14 shows a transfer relay, vacuum tube amplifier and vibrating relays at station IR for west-east transmission.

Fig. 15 shows eight-channel receiving, sending and correcting ring sets. These sets serve in repeating signals during west-east transmission. Individual oscillographs are provided for monitoring seven-channels of both incoming and outgoing signals during west-east transmission.

Fig. 16 shows eight-channel monitoring rings for providing a printer record over one channel of both incoming and outgoing signals when transmitting in a west-east direction. Accordingly a monitor relay and a printer are shown for each side of the channel, that is, the receiving and sending sides, selected for obtaining printer records of both the incoming and outgoing signals.

Fig. 17 shows a switching arrangement and the timing mechanism, and phonic wheel motor therefor.

Fig. 18 shows a set of five storing relays and a continuous electrical circuit which are common to transmission in both directions.

Fig. 19 shows a transfer relay, a vacuum tube amplifier (diagrammatically shown) and a vibrating relay circuit at station IR for east-west transmission.

Fig. 20 shows eight-channel receiving, sending and correcting ring sets for east-west transmission. Individual oscillographs are provided for seven-channels receiving and seven-channels sending when transmitting in an east-west direction.

Fig. 21 shows eight-channel monitoring rings similar to those shown in Fig. 16 except that they serve to monitor the channel selected for printer records on both the incoming and outgoing signals during east-west transmission. The monitoring relay shown in Fig. 16 serves to also cooperate with the printers shown in Fig. 21.

Figure 1:
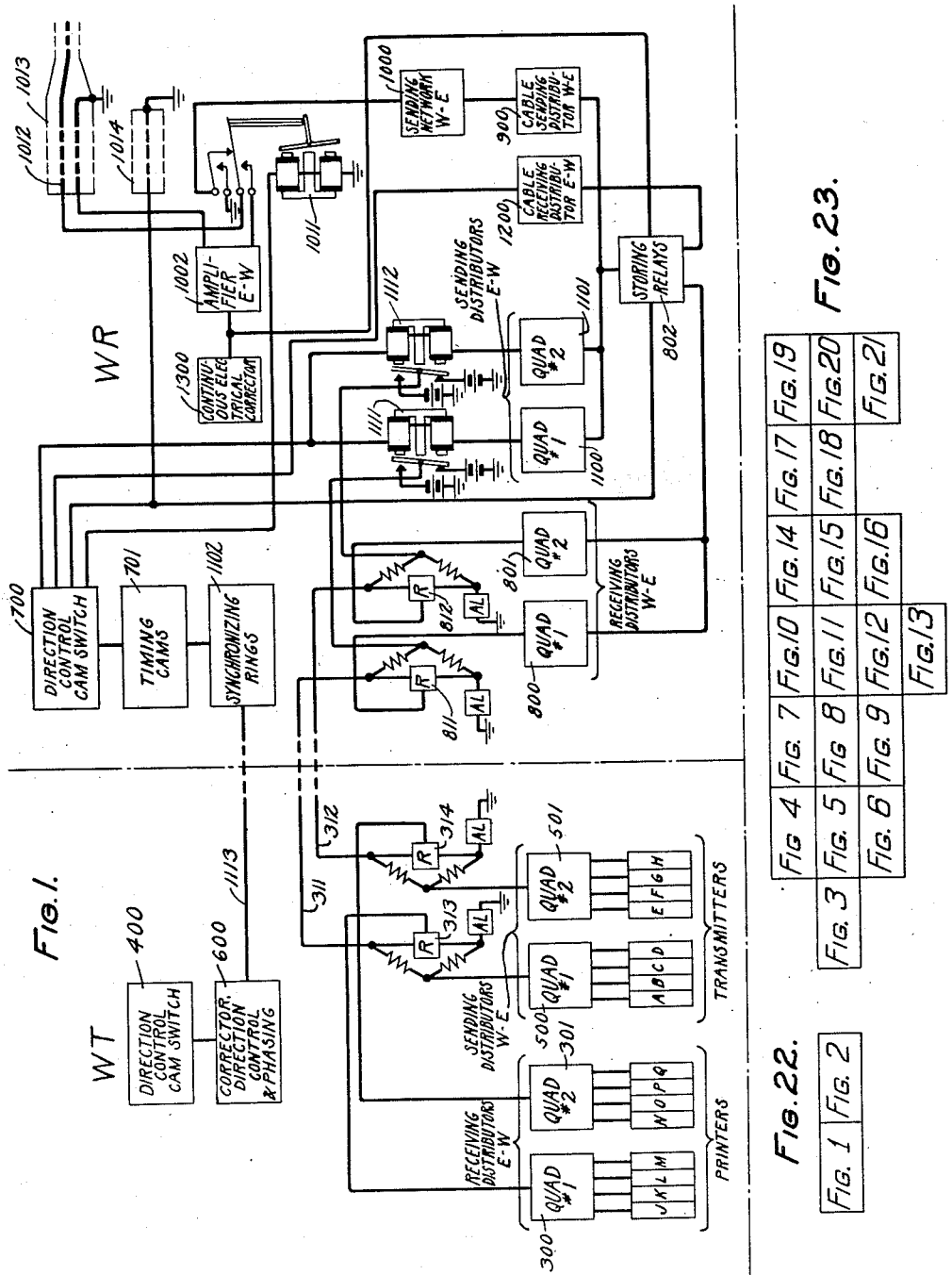
Figure 2:
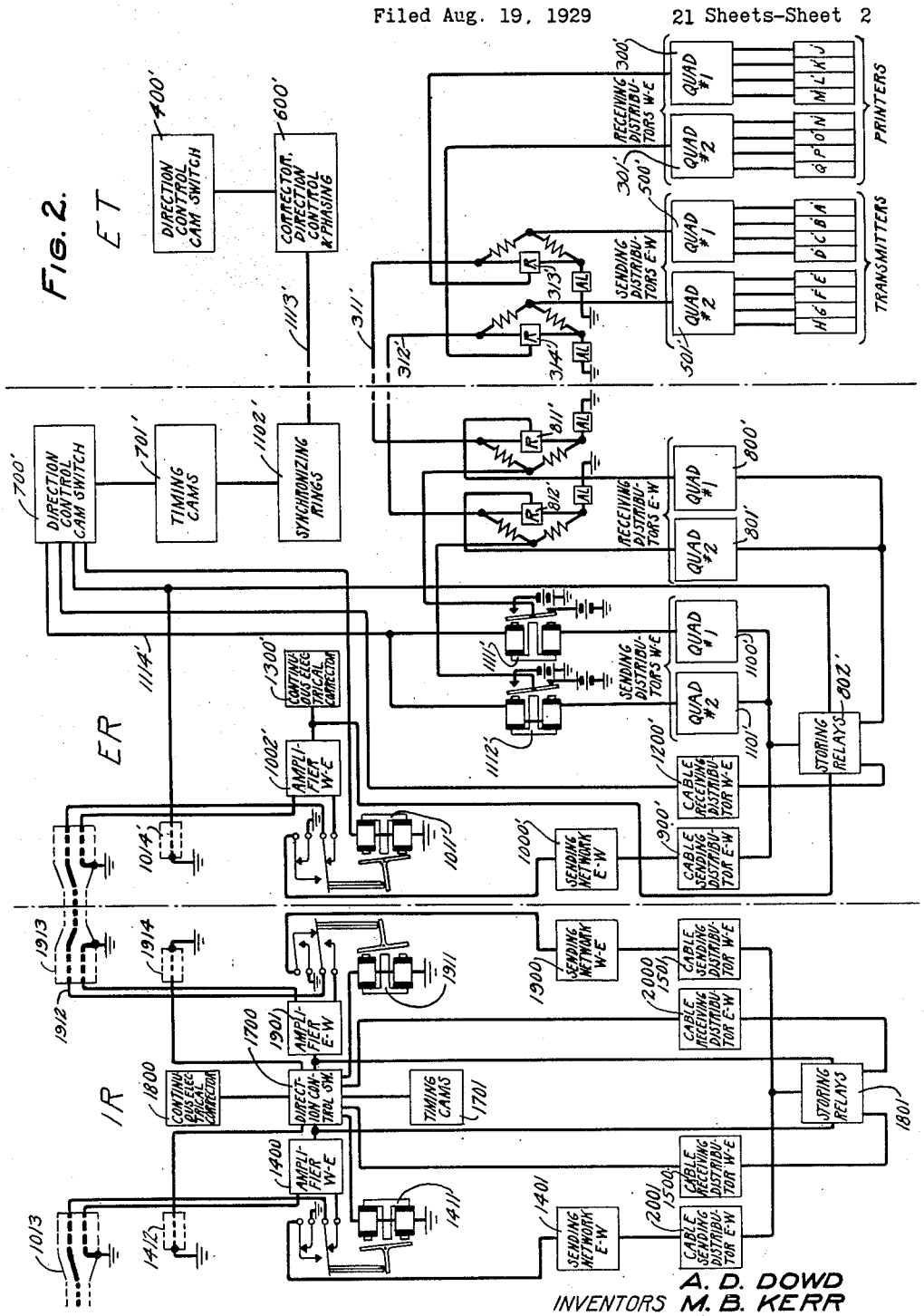

The schematic drawing of Figs. 1 and 2 sets forth the interrelation of the elements of the system briefly described above. The system is arranged to automatically change its direction of transmission at predetermined intervals. Assume that the system is set in a position for west-east transmission as shown. This setting is accomplished by the continuously operating timing cams 701, 1701, and 701' at cable repeating stations WR, IR and ER respectively. The timing cams at each station simultaneously close at predetermined intervals a series of contacts for completing a circuit to operate its associated direction control cam switch. The blocks 700, 1700 and 700' represent the direction control switches at stations WR, IR and ER respectively. The direction control switches at terminal stations WT and ET are controlled from repeating stations WR and ER respectively. The control switch 400 at station WT is operated from the synchronizing ring set 1102 at station WR, which set is arranged to transmit a series of unit impulses of alternate polarity in the form of a 25 cycle alternating current over pilot line 1113 to a correcting ring set 600. The control switch 400' at station ET is similarly operated from the synchronizing ring set 1102' at station ER over pilot line 1113' to a correcting ring set 600'. The impulses from the synchronizing ring sets are also employed for phasing and correcting as will be described hereinafter.

The tape transmitters A to H inclusive are divided into two groups, the first group A to D being connected to duplex line 311 through sending ring set 500 and the second E to H being connected to duplex line 312 through sending ring set 501. The sending ring sets are so arranged that two transmitters of different groups are respectively connected to the duplex lines almost simultaneously, the slight difference in time being due to the staggered arrangement of the segments of one ring set with respect to those of the other ring set. At a given instant one of the transmitters will start sending signal impulses over line 311 and while this transmitter is still impressing its first impulse on the line, a transmitter of the second group starts sending its first impulse over line 312, and so on for the remaining impulses, the impulses from one group of transmitters being sent slightly ahead of the corresponding impulses from the other group. Ring sets 500 and 501 are of the four-channel type.

The impulses on lines 311 and 312 are received at station WR in receiving apparatus 811 and 812 respectively, wherein they are regenerated and respectively distributed over the quad receiving ring sets 800 and 801 to a set of five storing relays 802. The storing relays are successively operated by the impulses from the receiving ring sets 800 and 801 and the impulses are thereby reproduced for distribution through the sending distributor ring set 900, which is of the eight-channel type. The segments of ring set 900 are so connected to the armatures of the storing relays that the impulses corresponding to those sent by two transmitters of different groups are interleaved when impressed on the outgoing circuit, the circuit extending from ring set 900 through sending network 1000, the middle contact of transfer relay 1011, conductor 1012 of the cable 1013. It will be noted that the relay 1011 is in its position for west-east transmission. The transfer relays at the other stations are likewise set in this position.

The transmitted impulses incoming from station WR are received at station IR over the lower contact of relay 1411, by the amplifier 1400, wherein the impulses are sufficiently amplified, and the amplified impulses are then impressed on a circuit extending through the storing relay set 1801, receiving distributor ring set 1500 to ground at the direction control switch 1700. The storing relays of this set operate in rotation to reproduce the impulses and impress them on a circuit extending through sending distributor ring set 1501, sending network 1900, middle contact of transfer relay 1911, conductor 1912 of cable 1913, to station ER. The receiving and sending ring sets at station IR are both of the eight-channel type.

The signals incoming from station IR are received at station ER over the lower contact of transfer relay 1011', by amplifier 1002', wherein the impulses are amplified and impressed on the circuit extending through storing relay set 802', receiving distributor ring set 1200', to ground at direction control switch 700'. The storing relays of set 802' operate in rotation, and the signal impulses reproduced thereby are alternately impressed over the circuits respectively extending to two duplex lines 311' and 312'. These two circuits respectively include in turn sending ring sets 1100' and 1101' of the four-channel type, the windings of sending-on relays 1111' and 1112' and common conductor 1114' which extends to cable sending ground 1014' through closed contacts at direction control switch 700'. Relays 1111' and 1112' respectively reproduce the impulses transmitted from the two transmitters of different groups at station WT which are then impressed almost simultaneously over duplex lines 311' and 312' to station ET.

The impulses incoming at station ET are received in receiving apparatus 313' and 314' wherein they are regenerated and impressed through the receiving distributor ring sets 300' and 301' of the four-channel type to the printers J' to Q'.

At the end of the interval of the transmission from west to east, timing cams at stations WR, IR and ER, again close a series of contacts simultaneously to complete the operating circuit for their respectively associated direction control switches, and the relays 1011, 1411, 1911 and 1011' reverse their positions whereby the cable is now arranged for transmission in an east-west direction. The operation of the system for east-west transmission is identical with that described above for west-east transmission. Connected to the amplifiers at each of the cable repeating stations is a continuous electric correction circuit which is shown diagrammatically at station WR by block 1300, at station IR by block 1800 and at station ER by block 1300'. The mechanical correction circuits for the quad distributors at stations WT and ET are respectively shown by blocks 600 and 600', these circuits being under control of synchronizing rings 1102 and 1102' respectively located at the cable terminal stations.

*Description of the apparatus*

*Apparatus in general.*—In general the apparatus at each terminal station consists of two groups of transmitters and two groups of receivers, each group being connected to a set of distributor rings for either collecting the signals from the transmitters or directing signals to the printers. The sending rings of one group and the receiving rings of another group are mounted together on one quad distributor face and the other sending and receiving rings of these groups are mounted on the second quad distributor face. At the repeating stations adjacent to the terminal stations, the two four-channel sending and the two four-channel receiving rings are mounted as concentric rings on a common distributor face, which operates into a second distributor face whereon eight-channel sending and receiving rings are mounted for connection to the first section of submarine cable. At the repeating station interconnecting the sections of the cable, two eight-channel distributor faces are employed. The two distributor faces at each repeating station are driven by a common motor.

Of the auxiliary apparatus which is provided for timing, for phasing and synchronizing the distributors, for automatically reversing the direction of transmission and for monitoring at each station the incoming and outgoing signals, only that employed in phasing, synchronizing and in oscillograph monitoring are mounted on the main distributors. The apparatus provided for timing, reversing the direction of transmission, and monitoring on printers, are mounted on separate distributor units, one being provided at each repeating station and each unit being driven by a motor separate from those used to drive the main distributors. The two motors at each repeating station, however, are driven from a single tuning fork, and therefore operate at the one speed. The auxiliary apparatus at the terminal stations are under the control of the apparatus at the respectively adjacent repeater stations. The synchronizing at the repeater stations is accomplished by continuous electrical correcting means whereas the synchronizing at the terminal stations is accomplished by mechanical correcting circuits.

The high speed of the signals may be transmitted over its permalloy-loaded cables which permits use of a number of sets of standard type printing telegraph transmitters and receivers operated multiplex. These transmitters and receivers are well known in the art and have been indicated schematically. Each receiver or printer comprises five magnets one for each impulse of the five pulse code employed, which, when operated in accordance with the code, selects means for printing the corresponding characters, and another magnet for advancing the printing surface to receive the next character and to release the printer. Each transmitter comprises means such as a perforated tape for controlling the application of the particular combination of potentials on five selecting members to repeat the code corresponding to the character to be transmitted and a magnet for wiping out the set and advancing the tape for the next character.

The distributors are of the type well known in the multiplex telegraph art comprising a plurality of concentric rings generally arranged in pairs one solid and one segmented. A conducting brush mounted on a rotatable arm makes an electrical contact between the rings of a pair. The segmented rings of the distributor employed in the high speed section of the system are each divided into four sections, each section constituting two channels wherein the impulses of the two channels are interleaved for transmission. In the low speed sections of the systems wherein the duplex lines are employed, the distributor faces are substantially the same except that the segmented rings thereon are each divided into four sections of one channel each.

The quad distributor faces at each of the terminal stations WT and ET are driven by a common fork-controlled motor, the faces being arranged on opposite sides of the distributor and at right angles to the main shaft of the motor.

*Apparatus at the west terminal station.*— At the west terminal station WT two quad distributor faces are provided, whereof rings 315 to 319 inclusive, 511 to 515 inclusive and 614 and 615 appear on one face; and rings 320 to 324 inclusive, 516 to 520 inclusive and 616 and 617 appear on the other face. Brushes 325, 326, 521, 522 and 618 serve one face while brushes 327, 328, 523, 524 and 619 serve the other face. All the brushes are driven from one main shaft.

Ring 317 distributes the signals incoming over duplex line 311 to the printers J to M inclusive, and ring 322 distributes the signals incoming over duplex line 312 to printers N to Q inclusive, the signals incoming over lines 311 and 312 being respectively repeated by relays 313 and 314. Rings 318 and 319 operate the magnets 337 to 340 which control the printing operations of printers J to M. Rings 323 and 324 operate the magnets 341 to 344 inclusive which control the printing operations of printers N to Q. The receiving relays 313 and 314 are arranged to repeat impulses incoming over their respectively associated duplex lines only during those intervals wherein transmission is from east to west, the change-over being effected by cams 413 and 414 of direction control switch 400. Rings 315 and 320 distribute incoming signals over leak circuits to a series of oscillographs 345 to 352 inclusive, one being provided to monitor the signals received over each channel.

Ring 513 distributes the impulses from each of the transmitters A to D inclusive over conductor 529 to the duplex line 311. Rings 514 and 515 successively close the operating circuits of transmitters A to D over the closed contacts of cam 417 at switch 400 when the cam is in a position for west-east transmission. Ring 518 distributes the impulses from transmitters E to H inclusive over conductor 534 to duplex line 312. Rings 519 and 520 close the operating circuits of transmitters E to H successively over closed contacts of cam 416 at switch 400. The channels of transmission are respectively designated herein A to H to correspond with the designations of the transmitters.

Rings 616 and 617 cooperate with relays 620 and 621 to maintain the distributors at this station in synchronism with the distributors at repeater station WR, the synchronizing impulses being received from station WR over pilot line 1113. Rings 614 and 615 serve to operate stepper magnet 420 which controls the operation of escapement cam 421 so that the shaft of switch 400 may operate in steps in response to the periodic operation of motor 422, through the friction clutch 423.

Pilot line 1113 serves in addition to providing a path for the synchronizing impulses sent from station WR, to permit phasing impulses to be transmitted in lining-up station WT with station WR at the beginning of a day's run, whereby phasing lamps 622, 623 and 624 may be operated to indicate the relative positions of the distributor brushes at station WT with respect to those at station WR. Receiving ring sets 300 and 301 are orientable with respect to the other rings on their respective distributor faces and therefore may be rotated in either direction in order to get the proper phase as indicated by the phasing lamps. After the proper phase relation has been obtained, the distributors at station WT are maintained in synchronism with those of station WR by means of mechanical corrector 625, the main shaft of which is connected at one end to the main shaft of motor 626 which serves the two quad distributor faces at this station and at the other end to the shaft which is coupled to the shafts upon which the brushes of the distributor faces are mounted. A complete description of the operation of the mechanical corrector may be had by referring to Locke U. S. Patent 1,670,461, granted May 22, 1928.

*Apparatus at west repeating station.*—The apparatus at the west repeating station WR comprises two sets of four-channel receiving rings and two sets of four-channel sending rings, mounted on what is referred to herein as a double quad distributor face. The duplex lines 311 and 312 are respectively connected through receiving relays 811 and 812 or sending-on relays 1111 and 1112 to this distributor face. A second distributor face referred to herein as a cable distributor face, is provided at this station for repeating the signals to and receiving signals from the first section of a submarine cable. Electrically connected intermediate the two distributor faces is a set of storing relays 802 which are common to repeating signals in either direction. A third distributor face referred to herein as a monitor distributor, is also provided and is arranged to be driven by the motor 727 which drives the direction control cam switch 700 and timing cams 701. A separate motor 1300 is provided for driving both the double quad and the cable distributors, the motor being operated from vacuum tube tuning fork 1301, which serves to also drive motor 727.

The double quad distributor has mounted thereon rings 813 to 816 inclusive, 1135 to 1138 inclusive, and 1128 and 1129 which are served by rotatable brushes 827, 828, 1139, 1140 and 1133 as shown. The cable distributor has mounted thereon rings 914 to 916 inclusive, rings 1211, 1212, 1310 and 1311, which are served by rotatable brushes 933, 1210 and 1314 as shown. The monitor distributor has mounted thereon rings 911, 912, 927, 928, 1224, 1225, 1227 and 1228, which are served by rotatable brushes 944, 934, 1229 and 1230 as shown. The quad receiving rings 813 and 816 respectively distribute the impulses reproduced by receiving relays 811 and 812 to the storing relays at 802, the storing relays alternately operating in response to the impulses reproduced by each of relays 811 and 812. Ring 912 is provided to furnish a printer record of the signals incoming from station WT over any one of the channels, the channel selected for the purpose of illustration being channel A on receiving ring set 800 as represented by the connection of printer 913. Any channel may be selected by connecting printer 913 to the corresponding group of segments of ring 912 and key 826 is provided in case the channel selected is any one of those on receiving ring set 801. Oscillographs 817 to 820 are respectively provided for the four channels on ring set 800 and oscillographs 821 to 824 are respectively provided for the four channels on ring set 801 in order to obtain a signal wave record on every channel, the oscillographs being connected in a circuit extending through the left hand winding of monitor relay 929 which is arranged to repeat the signals to printer 913.

The signals reproduced by storing relays set 802 are impressed over segmented ring 914 and continuous ring 915 of sending ring set 900 for transmission over conductor 917, through the sending network 1000 to the first section of cable 1013. Ring 916 which forms a part of sending ring set 900 distributes the impulses reproduced by storing relay 802 over leak circuit paths to a series of oscillographs 918 to 924. Oscillographs are provided for seven channels, although only four are shown. The eighth channel or channel A, as in this case, is monitored over ring set 902, by a printer record produced in printer 926 by the operation of quad monitor relay 930 through its left hand winding.

For signals incoming from the first cable section 1013 during east-west transmission, the channels therefore being herein designated A' to H', a vacuum tube amplifier, represented diagrammatically by block 1002, is adapted to receive and amplify the signals which in turn are impressed through a pair of vibrating relays 1015 and 1016, the storing relays of set 802 in rotation, receiving ring set 1200, conductor 1222, to ground at cam 718 of switch 700. Ring 1212 of ring set 1200 is provided with double segments for each impulse reproduced by storing relay set 802, the second segment of each pair being employed to operate oscillographs 1213 to 1219 inclusive, one being provided for each of channels B' to H' inclusive, channel A' being monitored by printer 1223 which is connected to ring 1224 of cable receiving monitor ring set 1202. Printer 1223 is operated by cable monitor relay 930 which itself is operated over the cable incoming leak circuits extending through its right hand winding.

The east-west signal impulses are reproduced by storing relay set 802 and are alternately impressed on and distributed through quad sending rings 1136 and 1138 to operate the sending-on relays 1111 and 1112, the storing relays being alternately connected to adjacent segments of each of rings 1136 and 1138. Relays 1111 and 1112 repeat the signals over conductors 1115 and 1116 to the duplex lines 311 and 312 respectively. Monitoring records are also taken of the signals outgoing to the duplex lines by oscillographs 1117 and 1124, one being provided for each of the eight channels A' to H'. A monitor printer record is also made of channel A' by printer 1226 which is operated by quad monitor relay 929 which itself is operated over a circuit extending through the winding of sending-on relay 1111, through its own right hand winding, contacts of cam 716 of switch 700 to ground on return cable 1014. Switch 1132 is provided to connect either sending-on relays 1111 or 1112 to the right hand winding of monitor relay 929 so that the printer record may be taken on any channel desired, providing of course that the printer 1226 is connected to the segments of the particular channel.

The direction control cam switch 700 is controlled by timing cams 722 to 725. Cam 722 referred to herein as the master cam is fixedly mounted on the shaft of motor 727 which is arranged to operate at a relatively high speed say about 300 revolutions per minute. Cooperating with the motor shaft 728 is shaft 729 which is arranged through reduction gears to rotate at a considerably slower rate, say about five revolutions per minute and cooperating with shaft 729 are shafts 730 and 731 which are arranged to rotate at a slightly slower rate say one revolution every twelve minutes. Cam 726 is cut so as to effect a circuit change every six minutes. A detailed description of the operation of the timing cams will be hereinafter given.

Ring set 1102 serves to transmit a five cycle alternating current per revolution or a current of 25 cycles per second over pilot line 1113 to the terminal station WT whereby direction control synchronizing and phasing apparatus at the terminal station are directly controlled from station WR. Ring set 1301 provides correcting impulses to operate electrical correction circuit 1302.

*Apparatus at the intermediate repeating station.*—The apparatus at the intermediate repeating station IR is the same at both sides of the station, each side having apparatus identical with that shown on the cable side of station WR. The monitoring distributor face is different in that all ring sets thereon comprise cable monitoring rings instead of two sets of line and two sets of cable monitoring rings. There are in all three distributor faces, one comprising ring sets 1500, 1502 and 2001, at which the cable section extending to station WR is terminated; another comprising rings 2000, 1501, and 2002 at which the cable section extending to station ER is terminated; and the third comprising ring sets 1600, 1601, 2100, 2101. The first two faces are referred to herein as main or cable distributors and the last as a monitor distributor. The ring sets 1600 and 1601 respectively serve to monitor the incoming and the outgoing signal impulses by printer records on any one west-east channel. Ring sets 2100 and 2101 perform a like function except that the channel selected is for east-west transmission. The monitor printer 1611 is arranged to print a record of the signal impulses incoming on the selected west-east channel A and the monitor printer 1613 is arranged to print a record of the impulses outgoing on channel A. Monitor relays 1612 and 1614 are each operated through their left hand windings to effect the operation of printers 1611 and 1613 respectively. The monitor printers 2111 and 2112 print records of the signal impulses incoming and outgoing respectively, over the selected east-west channel A'. Monitor relays 1612 and 1614 are operated through their right hand windings to effect the operation of printers 2111 and 2112 respectively.

The signals incoming at the west cable section 1013 are received in amplifier 1400, vibrating relays 1413 and 1414 and the left hand winding of the relays of the storing relay set 1801 in a circuit which is completed through the receiving ring set 1500 to ground at cam 1715 of direction control switch 1700. The storing relays are operated in rotation by the incoming signal impulses which are reproduced and transmitted through sending ring set 1501 in a circuit extending over conductor 1511, through sending network 1900, over the middle contact of transfer relay 1911, conductor 1912 of cable 1913. The signals on channels B to H incoming over cable 1013 are monitored at the receiving ring set 1500 by oscillographs 1512 to 1518, and these same signals before being retransmitted to cable 1913 are monitored at the sending ring set 1501 by oscillographs 1519 to 1525. Printer 1611, as stated above produces a monitor record of the incoming signals on channel A and printer 1613 produces a monitor record of the outgoing signals over channel A in west-east transmission.

In east-west transmission the signals incoming over cable 1913 are received in vacuum tube amplifier 1901 (shown diagrammatically), vibrating relays 1915 and 1916, the right hand windings of the storing relays of set 1801, receiving distributor ring set 2000 in a circuit extending over conductor 2028, to ground on cam 1715 when set in the opposite position to that shown. The impulses reproduced by the storing relays of set 1801 are distributed through sending ring set 2001, to conductor 2011, sending network 1401, over the middle contact of transfer relay 1411, when set in the opposite position to that now shown, to conductor 1012 of cable 1013. The signals on channels B' to H' incoming over cable 1913 are monitored by oscillographs 2012 to 2018, and those outgoing over cable 1013 are monitored by oscillographs 2019 to 2025. The monitor records of the east-west signals on channel A' is, as stated above, obtained at the receiving end on printer 2111 and on the sending end on printer 2112.

The direction control switch 1700 is controlled by timing cams 1701 in a manner outlined above for station WR. Motor 1702 serves to drive the direction control switch 1700, timing cam 1701 and the monitor distributor.

Continuous electrical correction circuit 1800 is controlled by relay 1811 and is made common to transmission in both directions through cam 1713 of the direction control switch 1700. The vacuum tube vibrating fork circuit 1802 serves to drive motors 1702 and 1803, the latter being used to drive the two main or cable distributors.

*Apparatus at the east repeating and east terminal stations.*—The apparatus at the east stations are identical with that shown at stations WR and WT respectively, and therefore no further description is necessary.

*Transmission details*

*Transmitting.*—The signal code employed in modern submarine telegraphy is the "Baudot" or five impulse per character code, and the transmitters A to H inclusive and A' to H' inclusive represent the type adapted to send this type of code. Assuming transmission to be in a west-east direction transmitters A to H are arranged in two groups, namely, A to D and E to H, each group being connected to a duplex line such as 311 and 312 over which the impulses from each transmitter are sent successively. The impulses from the transmitters in one group are sent slightly later than the impulses of the corresponding transmitters in the other group. The impulses are received over duplex lines 311 and 312 at station WR by receiving relays 811 and 812 wherein they are reproduced and impressed over ring sets 800 and 801 on the storing relay set 802. The storing relay groups consist of five polarized relays each having two windings. The left hand winding of each relay is arranged to be energized by signals coming from station WT and the right hand winding of signals coming from station IR. The alternate receiving segments of ring sets 800 and 801 are connected to one end of the left hand windings of the storing relays, the other end being connected over common lead 825 to ground at cam 721 in the direction control switch 700. The live or alternate segments of ring set 800 are staggered with respect to the live or alternate segments of ring set 801. By this arrangement alternate relays of the storing relay set are made to respond in continuous rotation to the impulses received over the channels on ring set 800 and the relays intermediate those operated over the channels on ring set 800, are responsive in continuous rotation to the signals received over the channels on ring set 801. This operation may be readily understood from the following table which shows how the alternate or live segments of rings 814 and 816 of ring sets 800 and 801 respectively are connected to the left hand windings of the storing relays 1 to 5.

| Storing relay | Live segments of ring 814 | Live segments of ring 816 |
|---|---|---|
| 1 | 1, 6, 11, 16 | 3, 8, 13, 18 |
| 2 | 4, 9, 14, 19 | 1, 6, 11, 16 |
| 3 | 2, 7, 12, 17 | 4, 9, 14, 19 |
| 4 | 5, 10, 15, 20 | 2, 7, 12, 17 |
| 5 | 3, 8, 13, 18 | 5, 10, 15, 20 |

The signals reproduced by the storing relays are impressed in rotation over sending ring set 900 over conductor 917, on to cable 1013 in such manner that the impulses from transmitter A are interleaved with those of transmitter E, the impulses of transmitter B are interleaved with those of transmitter F and so on for the impulses of the transmitters C and D and E and H. The signals on conductor 917 are transmitted through the sending shaping network 1000 which comprises a condenser 1017 shunted by a variable resistance 1018 together with an impedance 1019 in series with the condenser 1020 connected between the cable terminal and ground. Impedance 1019 has a low value as compared with the characteristic impedance of the cable while the capacity of condenser 1020 is so large that it has little influence on the action of impedance 1019 at any but the extremely low frequency components of the signal. This sending network and operation thereof is disclosed in greater detail in U. S. Patent 1,624,396, granted to A. M. Curtis, April 12, 1927.

The signals incoming over cable 1013 at station IR are shaped by a network 1415, and amplified by a vacuum tube amplifier 1400, both of which are described in detail in Curtis U. S. Patents 1,624,396 and 1,673,042, the latter patent being granted June 12, 1928. The means for correcting the bias or zero wander have not been shown inasmuch as it may be conveniently supplied by reference to prior publications, such as Curtis U. S. Patent 1,689,328, granted October 30, 1928. The amplified impulses are then impressed on the vibrating relays 1413 and 1414 which control the operation of each other when no signals are received from the amplifier, to interpolate impulses of unit length which are lost during transmission. The signals reproduced by the vibrating relays are impressed on the left hand winding of the storing relays of set 1801 through the ring set 1500, over conductor 1531 to ground at cam 1715 in direction control cam switch 1700. The relays of this group are arranged to operate successively in response to the impulses received from the vibrating relays and the corresponding signals reproduced by storing relays of set 1801 are impressed over the ring set 1501 on to the outgoing conductor 1511, through the sending shaping network 1900 to the cable 1913. The network 1900 is the same as sending network 1000 described above.

The details for transmitting through stations ER and ET in the west-east transmission are the same as those which will be described below for transmitting in an east-west direction through stations WR and WT.

*Reception.*—Assuming that the transmission is now in an east-west direction and beginning at station IR with the description of the reception of signals, because of the similarity of apparatus at stations ER and ET to that at stations WR and WT respectively, the signals are received over shaping network 1917, vacuum tube amplifier 1901, and impressed on the vibrating relays 1915 and 1916 wherein the impulses of unit length are interpolated. The signals produced by the vibrating relays are impressed over the outer right contact of cam 1715 in direction control switch 1700, through the right hand windings of the storing relays of set 1801, receiving ring set 2000, over conductor 2028 to ground at the outer left contact of cam 1715, it being understood of course that the direction control switch 1700 is in a position opposite to that shown. The signals reproduced by storing relays 1801 are now impressed through ring set 2001 over conductor 2011, through sending shaping network 1401 to cable 1013. It will be noted that storing relay set 1801 is common to transmission in both directions.

Signals incoming over cable 1013 at station WR are received over the shaping network and vacuum tube amplifier 1002 shown diagrammatically, and impressed upon the vibrating relays 1015 and 1016 where the impulses of unit length are interpolated. Signal impulses reproduced at the vibrating relays are impressed on the right hand windings of storing relay set 802 through the receiving ring set 1200, over conductor 1222 to ground at cam 718 of direction control switch 700. The storing relays respond successively to these incoming impulses, but the impulses reproduced by them are alternately impressed through sending ring sets 1100 and 1101 and their respectively associated sending-on relays 1111 and 1112 to a common conductor 950, through the contact of cam 716 to ground at the return cable 1014. The impulses reproduced by the sending-on relays are respectively impressed over conductors 1115 and 1116 on to duplex lines 311 and 312 to the receiving relays 313 and 314 at station WT. The impulses reproduced by relay 313 are impressed through ring set 300 to operate the printers J to M successively and the impulses reproduced by relay 314 are impressed through ring set 301 to operate the printers N to Q successively, both sets of printers operating simultaneously.

*Phasing.*—In order to phase the distributors at the different stations to the incoming cable signals during the time that the system is being lined-up for operation at the beginning of a day's run, it is necessary that the distributor brushes employed in the whole system shall be in the one relative position, taking into consideration, of course, the lag of the cable, duplex lines and station equipments. It is preferable to have the system normally arranged to phase from west to east, that is, the correction to be applied to obtain the proper phase relations should be made at the stations receiving in west-east transmission. Inasmuch as only the west half of the system is shown herein, it will be necessary for the sake of illustration to describe the phasing operations as though the transmission were from east to west, and therefore the phasing will be described in connection with the east-west signals at stations IR, WR and WT.

Assuming that the phasing is in an east-west direction, the first operation is to phase the cable distributors at stations IR and WR with that at station ER. When the desired phase relation is had then the quad distributors at stations ER and WR are brought into phase with the cable distributors at their respective stations and finally the quad distributors at stations ET and WT are brought into phase with the quad distributors at stations ER and WR respectively.

The first operation when the attendants at the stations receive from the attendant at station ET a Morse code signal indicating that a run is to begin, is to start the motors at their respective stations and operate phasing keys such as 1526, 1527, 2026 and 2027 at station IR, 1126 and 1127 at station WR and 637 at station WT, although it is not necessary to operate key 637 until the phasing at the west repeater station is completed.

In east-west phasing, the phasing signals sent out from station ER over cable 1913 would consist of twenty plus impulses and twenty minus impulses following each other alternately. Any suitable means, such as those described in U. S. Patents 1,689,328 and 1,799,214, respectively granted to A. M. Curtis on October 10, 1928 and to A. A. Clokey on April 7, 1931, may be employed for providing the phasing signal impulses at station ER, as for example, a switching member such as switch 745 shown in Fig. 7 of Clokey Patent 1,799,214 may be used to connect cable 1913 at station ER to positive battery for the duration of twenty impulses and then to the negative battery for another twenty impulses and so on for the succeeding groups of twenty impulses, the positive and the negative batteries being connected to the conductors connected to the segments of the uppermost ring of the cable sending distributor at station ER which ring corresponds to ring 914 of the cable sending distributor 900 at station WR. These impulses are received over cable 1913 at station IR and impressed in turn on amplifier 1901 and the vibrating relays 1915 and 1916, whereby the vibrating relays reproduce them to operate the storing relays of set 1801. The storing relays operate to the positions shown in response to the plus impulses and to the opposite positions in response to the minus impulses whereby circuits which were prepared by the closing of switches 2026 and 2027 are momentarily completed by the brush rotating over the cable distributor sending ring set 2001. The circuits prepared in response to the plus impulses extend over the right hand contacts of the storing relays and those prepared in response to the negative impulses extend over the left hand contacts to operate two lamps connected to the segments of the first and the last channels, namely, channels A' and H', respectively, of the cable distributor ring set 2001. Thus the circuits for operating the lamp connected to channel A' each extend from the positive side of cable battery 1814, right hand contact and armature of one of the storing relays, the three rings of set 2001, operated contact of switch 2026, through its associated lamp, to the negative side of battery 1815, and the circuits for operating the lamp connected to the channel H', segments of ring set 2001 each extend from the negative side of cable battery 1815, left hand contact and armature of one of the storing relays, the three rings of set 2001, operated contacts of switch 2027, through its associated lamp to the positive side of battery 1814. The changes in polarity of the impulses received over the segments of ring set 2001 would be from plus to minus between segments Nos. 20 and 21 and from minus to plus between segments 40 and 1. If the brush rotating over the segments of ring set 2001 is out of phase with the incoming signals, one or the other or both phasing lamps will light. The only time that both lamps will remain out is when the brushes are in their proper phase relation. When the brushes are 180° out of phase or in fact more than 90° out of phase, both lamps will light. Thus in the latter case one will light for a short time and the other for a long time. The lamp which is lighted or lights for the long period when both are lighted, indicates the direction in which the brushes are out of phase so that by orienting the receiving ring set 2000 of the cable distributor in the opposite direction until both lamps go out, the brushes are brought into phase.

When the cable distributor at station IR is brought into phase with the cable distributor at station ER, groups of twenty plus and twenty minus impulses which are being alternately transmitted from the storing relays of set 1801, over the segments of the uppermost ring and middle ring of set 2001, conductor 2011, sending network 1401, middle contact of relay 1411, conductor 1012, of cable 1013 to station WR, are employed to bring the cable distributor at station WR into phase with the cable distributor at station IR.

The phasing signal incoming at station WR is received over the lowermost contact of relay 1011 and impressed in turn on the amplifier 1002 and the vibrating relays 1015 and 1016. The vibrating relays reproduce the signal to operate the storing relays of set 802 through the segments of cable distributor receiving ring set 1200. As stated above, the twenty plus impulses operate the storing relays of set 802 to the positions shown and the twenty minus impulses operate them to their opposite positions. These impulses also serve to operate two lamps (not shown) connected to the segments of the first and the last channels, namely channels A' and H', on ring set 1200. These lamps, in conjunction with their associated phase switches, operate in the same manner as the phasing lamps and switches described above for station IR. In this way the cable distributor at station WR is phased with the cable distributors at stations IR and ER.

As soon as the cable distributor at station WR is in phase the alternate groups of twenty plus and twenty minus impulses reproduced by the storing relays of set 802, in response to the phasing signal, are utilized to phase the quad distributor at station WR with the cable distributor at the same station. Two lamps 1130 and 1131 are shown respectively connected to quadrant A' of quad distributor sending ring set 1100 and to quadrant H' of the quad distributor sending ring set 1101. The lamp of quadrant A' is connected through the segments of ring set 1136 to the positive side of cable battery 836 and the lamp on the H' quadrant is connected through the segment of ring set 1138 to the negative side of the same battery. The operation of the lamps in response to this phasing signal indicates the phase relation as stated above for station IR. Should there be a loss of phase, the quad distributor receiving ring sets 800 and 801 would be oriented in such direction as to cause the lamps 1130 and 1131 to go out. By this means the quad distributor ring sets at station WR are brought into phase with the cable distributors at stations WR, IR and ER.

The distributors at station WT are given their proper phase relation from ring set 1102 at station WR which is arranged when transmission is in a west-east direction, to transmit to the pilot line 1113 a series of unit impulses of alternate polarity to form an alternating current wave of five cycles per revolution. Ring set 1102 comprises rings 1128 and 1129, the former being continuous and the latter being divided into ten equal segments. The pilot line is connected at station WT to relay 620 which operates in response to the alternating current wave to operate relay 621, which normally operates to generate a series of positive impulses for effecting synchronism through ring set 600 as will hereinafter be described. Ring set 600 comprises ring 617 and ring 616, the former being divided into forty equal segments and the latter into two sections of unequal lengths, the short length 638 being coincident or in radial alignment with ten segments of ring 617. The segments of ring 617 coincident with the long section of ring 616, are connected in pairs, the alternate pairs being interconnected to form two groups. The segments of ring 617 coincident with ring sections 638 are also connected in pairs, the first of which is connected to lamp 622, the third to motor drive relay 640 and the fifth to lamp 624, the second and fourth pairs intermediate those so connected being left dead. A third lamp 623 is also provided which is arranged to operate only during the phasing adjustment. During the interval of transmission in a west-east direction the current received in the winding of relay 620 is, as stated above, an alternating current of five cycles per revolution of brush 1133 over the ring set 1102, and as brush 619, if it is in phase with brush 1133, passes over the segment pair connected to the winding of relay 640, it will transmit a negative impulse to the relay 640 whereby the relay armature is operated to its left hand position as shown. The negative impulse originates in a circuit extending from the negative side of battery 1125, over the closed lower contact at cam 726 of timing cam switch 701, the ninth segment of ring set 1102, pilot line 1113, through the winding of relay 620 to ground. The lower contact of cam 726 of timing cam switch 701 is closed only when transmission is in a west-east direction. During the intervals of transmission in an east-west direction, when the phasing adjustment is made, the five cycle alternating current is changed because the upper contact associated with cam 726 of timing cam switch 701, is closed and the positive side of battery 1125 is therefore connected to the ninth segment of ring set 1102. Thus during a receiving interval at the west end of the system the alternating current transmitted over pilot line 1113 is changed to a long positive impulse when brush 1133 passes over the last three segments of ring set 1102.

The long positive impulse provides a phasing signal for station WT by operating relay 620 which in turn operates through its right hand position to connect positive battery to the three active segment pairs coincident with ring section 638, thereby causing lamps 622 and 624 to light momentarily and in succession for each revolution of brush 619, and relay 640 to operate to its right hand position in which position it remains for the duration of the receiving interval. The phasing key 637 being in its operated position at the time of making the phasing adjustment, prepares an operating circuit for lamp 623 which circuit is momentarily closed once during each revolution of brush 619. Therefore, the lamp 623 lights intermittently as long as the phasing key 637 is closed during the receiving interval, provided, of course, that the brush 619 of ring set 600 is in phase with the impulses incoming over pilot line 1113. When either of lamps 622 or 624 does not light during each revolution of the brush 619, the distributors at stations WT are out of phase and the direction of correction is determined by the positions of the two lighted lamps. Phase correction is effected by orienting the entire distributor at station WT in one or the other direction until the three lamps light in their positions, one for every revolution of brush 619.

With the monitor distributors on the timing units it becomes necessary to phase the motors which drive these distributors so that the monitor brushes may be brought in phase with the main distributor brushes. This is accomplished by providing a relay 931 connected in series with the first segment on channel A of leak ring 916. Channel A, as stated above, is that on which the monitor printer record is taken, and therefore a second relay 932 is connected to the first segment of ring 928, which is also the first segment of the channel monitored by printer 926. Consequently relays 931 and 932 will operate simultaneously once per revolution of brushes 933 and 934 over their respective ring sets 900 and 902. The operation of relays 931 and 932 closes an operating circuit for the lamp 935, which should light once per revolution of the distributor brushes if the monitoring distributor is in phase with the main distributor.

Several reversals in the direction of transmission are effected before the distributors at all stations are in phase.

The phasing of the monitoring brushes at each of the cable repeating stations to their respectively associated main distributors automatically phases the position of the starting clutch on their associated timing unit in its proper position for the timing start. The timing must then be made at all the cable stations on the printer monitoring channel. At station WR the third active segment of channel A of ring set 902 is selected for effecting the start of the timing cams.

*Operation of timing cams.*—The timing cams at station WR are substantially the same as those at stations IR and ER and therefore a description of the timing cam shown in Fig. 7 will suffice for those shown at the other repeating stations. When the distributors at all stations are in phase, the attendant at the repeating station will operate a key, such as 936, which opens the circuits extending over the third segment of channel A of ring 914 and the third active segment of channel A of ring 928 and closes in their respective places, circuits one of which extends from the negative pole of battery 937 over the inner upper contact of key 936, segment $A_3$ and its corresponding segment in ring 916 through the rotation of brush 933, conductor 938, through the left hand winding of monitor relay 930 to the positive pole of battery 937 and the other, from the negative pole of battery 939, armature and left hand contact of relay 930, conductor 940, through the winding of timing clutch magnet 732, conductor 733, the outer lower contact of key 936, third active segment of ring 928, brush 934, ring 927, conductor 941, right hand contact of cam 720, conductor 734, to the positive pole of battery 939. The operation of magnet 732 allows lever 735 to move to the left under the tension of spring 736, and a slidable sleeve 737 having an operating tooth on its face, to engage another tooth mounted on a driving sleeve 738 which is fixedly mounted on shaft 728. The rotation of shaft 728 then drives shaft 739 which through the operation of worm 740 and gear 741 causes the operation of shaft 729. The worm 742 which is fixedly mounted on shaft 729 and is in engagement with gear 743 causing the operation of shaft 730. Shafts 730 through gears 744 and 745 operate shafts 731. Gears 744 and 745 are normally in engagement, but should it be desired to change the settings of cams 725 and 726 which are fixedly mounted on shaft 731, lever 746 which is in engagement with cam 747, as shown, would be raised and shaft 748 rotated by means of knob 749 whereby gears 744 and 745 are moved out of engagement, the raising and lowering of shaft 731 being effected by means of eccentric cam 750 and support 751. Also fixedly mounted on shaft 729 is worm 752 in engagement with gear 753 and the operation of gear 753 causes the rotation of shaft 754 and the driving sleeve 755 of direction control switch 700. As hereinbefore stated the motor shaft 728 has a speed of 300 revolutions per minute and through the master clutch 756 shaft 739 is operated at the same speed. By means of the reduction gears shaft 729 operates at a speed of five revolutions per minute and shafts 730 and 731 operate at a speed of one revolution every twelve minutes. Shaft 754 is geared to operate at the same speed as shaft 729.

Cam 722 which is fixedly mounted on shaft 728 allows ground to be connected momentarily to conductor 757 at every revolution of shaft 728. Cam 723 which is fixedly mounted on shaft 729 allows conductor 757 to be connected to conductor 758 for about four seconds out of every twelve seconds, and cam 725 allows conductor 758 to be connected to conductor 759 momentarily every six minutes. Therefore every six minutes a circuit will be closed from ground at cam 722 through the contacts of cams 723 and 725 in series, through the winding of the switch magnet 760 to grounded battery 761. Magnet 760 operates momentarily to allow lever 762 to move to the right whereby a tooth on the face of sleeve 763 of clutch 764 engages a tooth on drive sleeve 755 and shaft 765 which carries the cams 711 to 721 of the direction control switch 700 starts to rotate at a speed of five revolutions a minute. However, the operation of shaft 765 is not continuous because of eccentric cam 724 which is fixedly mounted on shaft 729 and is in engageable relation with the toggle jointed member 766 which in turn is pivotally connected to lever 762. The release of lever 762 forces member 766 against the rotating cam 724 which is arranged to complete a revolution every twelve seconds. Cam 724 is so cut that at the end of six seconds or one half revolution its periphery forces member 766 and lever 762 to the left to engage the released armature of magnet 760, thereby withdrawing clutch sleeve 763 out of engagement with sleeve 755. By this arrangement cam shaft 765 is made to rotate a half revolution every six minutes, the duration of the rotating interval being six seconds. Therefore the system shown is adapted for alternate transmitting and receiving intervals of six minutes each. The key 936 may be restored to the position shown as soon as the timing cams begin operating. Each of levers 735 and 762 are provided with hand knobs so that the timing and switching cams may be stopped at any time.

The timing cams at stations IR and ER are operated in substantially the same manner as those described for the timing cams at station WR by a starting signal from the distributor face transmitted over the cable after which impulses are transmitted automatically with predetermined time intervals.

The operation of the timing cams at the terminal stations WT and ET is somewhat different in that they are controlled directly from the respectively adjacent repeater stations. For the purpose of illustration the operation of the timing cams at station WT will be described. Direction control switch 400 at station WT is under control of motor 422 and stepper magnet 420, the magnet in conjunction with the duration of closure of spring member 767 with either of its associated contacts being arranged to determine through escapement cam 421, the number of steps the shaft 424 is to rotate in order to effect a reversal in the direction of transmission. When the direction of transmission is changing, that is, station WT is being positioned to receive this operation is started by cam 726 at station WR whereat the cam in rotating into its alternate position closes a circuit from the positive pole of battery 1125, conductor 1134, upper contact of switch 767, conductor 768, the ninth segment of ring 1129, brush 1133 and ring 1128, pilot line 1113, through the windings of relay 620 to ground. The operation of brush 1133 in transmitting alternating current over pilot line 1113 sends at this time three positive impulses instead of alternating current impulses over the last three segments of ring 1102, which holds relay 620 in the position shown. When brush 619 passes over ring section 638 and its coincident segments of ring 617, relay 640 is operated to its right hand position and holds ground to the circuit extending over conductor 641 and the left hand contact of cam 419 to operate motor 422. At the same time brush 618 is passing over the active segments of the interrupter ring set 601 and the circuit is completed to operate the stepping magnet 420, the circuit being traceable from negative battery through the winding of magnet 420, conductor 425, active segments of ring 614, brush 618, continuous ring 615, conductor 642, right hand contact of cam 412, to ground lead 641. Magnet 420 operates in a vibrating manner while brush 618 is repeatedly rotating over the active segments of ring 614 and thereby allows the switch shaft 424 through the escapement cam 421 and friction clutch 423, to rotate in steps, the shaft rotating one half step for each revolution of brush 618, or, in other words, for each momentary operation of magnet 420. In this way the actual transfer is brought about by transfer cams 411 to 419 inclusive. These cams are fixedly mounted on shaft 424 which is driven by motor 422 through friction clutch 423. The speed of rotation of the shaft is restricted by escapement cam 421 which in turn is controlled by magnet 420. As soon as magnet 420 energizes at the beginning of a receiving interval, shaft 424 is permitted to move and cam 411 closes a substitute ground for the motor 422, and magnet 420 in place of the ground on conductor 641 which is disconnected by the movement of cam 419 through its first step. Each time that the distributor rotates through one revolution magnet 420 energizes and shaft 424 moves in an angular distance measured by one half tooth on the escapement cam. As the shaft 424 rotates the cams 411 to 419 open and close circuits bringing about the transfer. When the shaft completes a half revolution, cam 412 opens the substitute operating circuit for motor 422 and magnet 420, and since cam 726 has moved switch 767 away from its lower or negative contact, and closed with its upper or positive contact, the direction control switch 400 comes to rest until the end of the receiving interval which in this case is six minutes. The change-over or transfer takes approximately six seconds.

The operation of motor 422 and stepping magnet 420 is prevented during the receiving interval of six minutes because at this time the armature of relay 640 is maintained in its right hand position and the spring at cam 419 is in engagement with its right hand contact. When transmission is reversed at station WR at the end of the six minute interval, spring 767 is moved by cam 726 to its lower contact whereby the negative pole of battery 1125 is connected to the ninth segment of ring set 1102 to send a negative pulse to relays 620 and 640. The armatures of relays 620 and 640 move, in response to this negative impulse, into their left hand positions, and ground at the armature of relay 640 is connected over the left hand relay contact, to the closed right hand contact of the spring member at cam 419 whereby the motor 422 is allowed to operate. The ground connection at the left hand contact of relay 640 is also connected over the upper contact of cam 412, to the conductor 642, active segments of ring set 601, conductor 425, through the winding of magnet 420 to negative battery, for effecting the stepping operation of the magnet. Shaft 424 is again stepped around through 180°, which requires six seconds, to a point where the operating circuit of the motor 422 is opened and the changeover from receiving to transmitting is completed. The point where this circuit is opened is at cam 411.

*Synchronization.*—Means are provided at each of the stations for correcting the main distributors for synchronism. A description of the correcting mechanism at station WT will suffice for that employed at station ET, both stations employing mechanical correctors of the type disclosed in Locke Patent 1,670,461, granted May 22, 1928. Likewise the description of the corrector employed at station WR will suffice for the correctors employed at stations IR and ER. The correctors at the repeating stations are of the continuous electrical corrector type such as disclosed in a copending application of W. A. Knoop, Serial No. 354,954, filed April 13, 1929. The correctors at stations WT and ET are respectively synchronized by special signals transmitted from stations WR and ER, respectively, over pilot lines, whereas the apparatus at each of the repeating stations maintains itself in synchronism by means of the signaling impulses received from the transmitting end.

The synchronizing impulses for station WT are received from battery 1125, over ring set 1102 at station WR. Ring set 1102, as stated above, is adapted to transmit a five cycle alternating current per revolution of brush 1133 over pilot line 1113 to relay 620 of station WT. Relay 620 operates and causes the corresponding operation of relay 621. When relay 621 operates to its right hand contact, a positive charge is stored on the upper side of condenser 631 and as brush 619 rotates over the segment pairs of ring 617 coincident with the long section of ring 616 it discharges over either of two paths, one path extending through one group of alternate segment pairs, through the right hand winding of relay 628 to battery 630 connected to the lower contact of magnet 629, and the other path extending through the other group of alternate segment pairs to battery 627. Should the distributors at station WT be in synchronism with the distributors at station WR, brush 619 will be in engagement with that group of alternate pairs connected to battery 627, but should there be a loss of synchronism, then brush 619 will be in engagement with the other group of segmented pairs and the discharge of condenser 631 will cause the operation of relay 628. Relay 628 will operate and close an operating circuit for magnet 629. Magnet 629 operates and closes a circuit extending through the left hand winding of relay 628 to restore the relay to its normal position. Magnet 629 also causes the mechanical corrector 625 to change the angular position of the distributor shaft with respect to that of the motor shaft. This is described more in detail in Locke Patent 1,670,461.

The correction of the distributors at the repeating stations is accomplished by the continuous electrical method as stated above. The arrangement is shown in Fig. 13. Relay 1312 is connected in the output circuit of amplifier 1002 and is responsive to the incoming signals over cable 1013. During the time the armature of relay 1312 is passing from one contact to the other, positive potential from battery 1313 is impressed on the ring set 1301 and should the distributors at this station be in synchronism with the signals, incoming from station IR brush 1314 will be passing over equal portions of adjacent segments in ring 1311, so that equal amounts of positive potential will be impressed on the grid circuits of rectifiers 1315 and 1316. Equal rectified currents would therefore be impressed on both sides of condenser 1317 and no "after effect" will be experienced, but should there be a loss of synchronism, brush 1314 will impress unequal amounts of potential on the rectifiers 1315 and 1316 which produce an unbalance of potential across the condenser 1317. The unbalanced potential is then impressed on the grid circuits of corrector tubes 1318 and 1319 to cause an increase in the plate current of one tube and a decrease in the plate current of the other tube. This difference in plate current is impressed on the magnetic field of the biased reactance coil 1320 to vary the current in the circuit extending through the magnet 1321 which drives tuning fork 1322. Consequently the speed of vibration of the tuning fork is altered in accordance with the speed of the tuning fork at station IR. A more complete disclosure of the continuous electrical corrector circuit may be had by referring to the copending application of W. A. Knoop, Serial No. 354,954, supra.

Operation of system

*Preparatory adjustments.*—In preparing the system for transmission after a period of non-use, a series of adjustments are made with timed intervals allowed for each adjustment. Assume that the direction transmission is to be in a west-east direction, the attendant at station WT sends a Morse code signal to each of the attendants at the other stations instructing them to start their motors at their respective stations. The Morse code equipment may be provided in a manner described in Curtis Patent 1,689,328, granted October 30, 1928. The speed of the motors which is 300 revolutions per minute is attained by adjusting weights provided for that purpose for the forks at each of the stations. The phasing keys at each station are then set in their closed positions, for example, key 637 at station WT, keys 1126 and 1127 at station WR and keys 1526, 1527, 2026 and 2027 at station IR are operated to their alternate positions. The corresponding keys at stations ER and ET are likewise operated to their alternate positions. In this way the distributors at stations WT, IR, ER and ET are phased with the distributor at station WR in a west-east direction. Then the timing cam keys, such as 936 at station WR, 1615 at station IR and a key corresponding to key 936 at station ER, are operated so as to effect reversals in direction of transmission. The system is then allowed to operate in a manner hereinbefore described for two or three reversals of the direction of transmission until the attendant at each station is sure that the distributors at his station are in phase, at which time the phasing and timing cam keys are operated to their normal positions. The operation of phasing is effected in a manner hereinbefore described.

*Transmission of letter code.*—As a further illustration of the operation of the system, let it be supposed that brushes 521 and 523 are in the positions shown and each about to begin a revolution. Assuming that the letter J is to be sent by transmitter A over channel A and letter L is to be sent by transmitter E over channel E, the tape of transmitter A will be punched so that first, second and fourth tongues of transmitter A will engage the marking contacts, while the third and fifth tongues remain in engagement with their spacing contacts and the tape of transmitter E will be punched so that the second and fifth tongues will engage their marking contacts while the first, third and fourth tongues will remain in engagement with their spacing contacts. Therefore as brush 521 moves over segments of channel A, a series of pulses will be sent over conductor 529 to duplex line 311, and as brush 523 moves over the segments of channel E, a series of pulses will be sent out over conductor 534 to duplex line 312. The impulses of channel E are sent slightly later than their corresponding pulses on channel A. The pulses of channel A consist of two negative, one positive, one negative, one positive and those on channel E of one positive, and one negative, two positives and one negative. This is in accordance with the arrangement herein adopted in which the spacing impulses from transmitters A, B, E and F are of positive polarity and those from transmitters C, D, G and H are of negative polarity, the marking impulses from each transmitter, of course, being of the opposite polarity. The pulses of channels A and E are recorded on monitor oscillographs 525 and 530, respectively, in a circuit traceable to ground at cam 418. The pulses of channels A and E will also cause the operation of relays 811 and 812 respectively at station WR. The relays 811 and 812 repeat the incoming pulses over their respective receiving rings 800 and 801. Assuming that a printer record is to be taken at station WR of the pulses received over channel A, key 826 is in the position shown, therefore, the pulses reproduced by relay 811 before being impressed on receiving ring set 800 are allowed to pass through the left hand winding of monitor relay 929. By means of key 826 a channel on either of ring sets 800 or 801 may be selected on which a monitor printer record may be produced. Ring set 800 distributes the pulses of channels A to D and ring set 801 those of channels E to H. The pulses impressed on the ring sets 800 and 801 are distributed over the storing relays of set 802, the relays being so connected to the segments of the two ring sets as to alternately respond to the pulses of channels A and E. The operation of relays 811 and 812 alternate in reproducing pulses over their respective lines and therefore the active segments of receiving ring set 800 are staggered with respect to those of receiving ring 801, so that the first pulse of channel A is impressed on relay 1 and is immediately followed by the first pulse of channel E which is impressed at relay 2. The second pulse of channel A is impressed on relay 3 and the second impulse of channel E is impressed on relay 4. The third pulse of channel A is impressed on relay 5 and the third pulse of channel E is impressed on relay 1. In like manner the remaining pulses of channels A and E, B and F, C and G and D and H are effective. The circuits completed by the operation of either relays 811 or 812 and their respectively associated brushes 827 or 828 may be traced to ground at cam 721. For the purpose of illustration, the circuit for the first pulse over channel A may be traced from the negative pole of battery 829, upper contact and armature of relay 811, uppermost contact of key 826, conductor 830, left hand winding of relay 929, conductor 942, middle contact of key 826, conductor 831, first quadrant of ring 813, brush 827, first active segment of ring 814 through the left hand winding of relay 1, common conductor 825 to ground at cam 721. Each of the pulses on channel A operate over the same circuit up to the point of the active segments of ring set 800 whereby each takes a separate path in accordance with the rotation of brush 827 to operate a separate relay of the storing relay set 802 and thence over the common ground conductor 825. The circuits of the pulses on channel E do not extend through the winding of relay 929. Monitor relay 929 operates to the position shown in response to the marking impulses received over channel A and the first, second and fourth selector magnets of printer 913 operate to produce the monitor printer record of channel A. A printer record may be obtained on any channel of ring set 901 by changing the connections of the selector magnets of printer 913 to the segments of the channel desired.

Monitor oscillograph records are obtained on all channels by dividing each of rings 813 and 815 of ring sets 800 and 801 respectively into four quadrants and connecting to each quadrant an oscillograph such as 817, 818 etc. By this arrangement the oscillographs and the monitor relay 929 are each connected in series in the circuits which operate the storing relays of set 802. In response to the pulses received over channels A and E the storing relays beginning with relay 1 operate in continuous rotation to engage their respective contacts as follows: minus, plus, minus, minus, plus, plus, minus, plus, plus and minus, each relay being twice operated.

Immediately after relay 1 operates, brush 933 makes contact with the first segment of channel A of ring 914 and the negative pole of battery 826 is connected over the left hand or minus contact and armature of relay 1 conductor 832, first segment of ring 914, brush 933, ring 915, outgoing conductors 917 and 1012 to the cable 1013. The pulse thus transmitted to the cable 1013 is the first pulse of channel A. When brush 933 reaches the second segment of ring 913 the circuit is closed from the positive pole of battery 836 over the right hand or plus contact and armature of relay 2, conductor 833, second segment of ring 914, brush 933, ring 915 and the outgoing conductors 917 and 1012. This represents the first pulse transmitted over channel E. Likewise when brush 933 reaches each of the succeeding segments of ring 914, either of the poles of battery 836 is connected over a contact and armature of one of the storing relays and impressed on the outgoing conductor. Thus an arrangement is provided whereby the pulses originating at the two channels from the transmitters of different groups are interleaved when transmitted over the cable. Ring set 900 comprises a third ring 916 which is divided into the same number of segments as ring 914. Like ring 914, the segments of ring 916 are connected to form groups wherein the segments of any two channels are interleaved, but the segments of each are connected in separate multiples. As stated above it is desired to secure a monitor printer record on the A channel of the outgoing signals.

Therefore the segments on channel A of ring set 916 are connected in multiple to conductor 938 through the left hand winding of monitor relay 930, conductor 946, contact of cam 717, to ground at the return cable 1014. The ground at cable 1014 is also connected to a mid-tap of battery 836 whereat the monitor printer circuit originates. This circuit is closed over brush 933, which is in engagement with the three rings of set 900. Relay 930 like relay 929 is of the polarized type having two windings each of which is arranged to repel its armature in response to marking pulses and attract it in response to spacing pulses. Therefore in response to the first, second, and fourth pulses on channel A, relay 930 will engage its left hand contact in a circuit traceable from the negative pole of battery 939, armature and left hand contact of relay 930, through the first, second and fourth selector magnets of printer 936 in succession as brush 934 passes over the segments to which these magnets are connected, ring 927, conductor 941, contact of cam 720, conductor 734, to the positive pole of battery 939. After the selector magnets of printer magnet 926 have taken their desired settings, the printer operating magnet 948 operates in the circuit just traced except that it does not extend over the contacts and armature of relay 930, and the printer records the signals outgoing over the cable on channel A.

The signals incoming over cable 1013 disregarding the attenuation of the cable, consist of one negative and one positive, two negatives, two positives, one negative, two positives and one negative. These are impressed over the lower contact of transfer relay 1411, through shaping network 1415, on to shaping amplifier 1400. However, due to the attenuation of the cable the impulses of unit length are lost, therefore, the signals impressed on the amplifier are actually three of zero current, one negative, one zero, one positive, two zero, one positive and one zero. The received signals are therefore amplified and impressed on the right hand or main winding of the vibrating relay 1414 the circuit being traceable from negative pole of battery 1416, resistance 1417, right hand winding of relay 1414, variable resistances 1418 to the movable contact at battery 1416. Connected in parallel with the output circuit of amplifier 1400 is the operating circuit for corrector relay 1811 which is traceable over the closed contacts of cam 1713. The operation of corrector relay 1811 effects the necessary correction for synchronism of the distributors at station IR with those at station WR, through the continuous electrical correction circuit 1800 hereinbefore described.

Assume that relay 1414 is in the position shown when the first transmitted pulse should be received. Negative pole of battery 1419 is connected over the right hand contact and armature of relay 1414, conductor 1420, middle contact of cam 1715, conductor 1723 through the windings of auxiliary vibrating relay 1413, conductor 1421, through left hand winding of storing relay 1 of set 1801, conductor 1813, first segment of ring 1528 of receiving ring set 1500, brush 1529, ring 1530, conductor 1531, inner left contact of cam 1715, to ground. The first pulse received from transmitter A at station IR, being of unit length, is lost due to the attenuation of the cable, and therefore no impulse will be received in the right hand winding of relay 1414 and the negative potential of battery 1419 operates storing relay 1, at the same time negative potential of battery 1419 is impressed over the right hand contact and armature of relay 1413 through the left hand or vibrating winding of relay 1414, conductor 1424, through the left hand winding of monitor relay 1612, conductor 1616, through the second segment of ring 1528, brush 1529, ring 1530, over ground conductor 1531. Relay 1414 operates to its positive position. The pulses sent through these two different circuits serve to operate in succession storing relay No. 1 over the first segment of ring 1528 and monitor relay 1612 over the second segment of ring 1528.

The next transmitted impulse is another of unit length and therefore no current flows through the main winding of relay 1414, but the negative potential of battery 1423 which had just been impressed over the right hand contact of relay 1413 and through the left hand winding of relay 1414 produced the opposite magnetic field to that produced by the corresponding polarity in the right hand winding, and therefore inasmuch as no current was in the right hand winding of relay 1414 at the time, the relay armature moved to engage its left hand contact. The operation of the armature of relay 1414 to its left hand contact causes the positive current to flow over conductor 1420, middle contact of cams 1575, conductor 1723, through the windings of relay 1413, thereby causing the armature of the latter relay to also engage its left hand contact. The operation of relays 1413 and 1414 to their positive contacts causes positive potential to be applied over the third and fourth segments of ring 1528 when engaged by brush 1529. The third and fourth transmitted pulses are both of negative polarity, but the first part or third impulse will be lost so that it has no effect on relay 1414, so that in the interim in which it is supposed to be received, positive current flows from battery 1419 over the right contact and armature of relay 1413 through the left hand winding of relay 1414 and the latter relay operates to its right hand contact, thereby sending the negative current over the fifth segment of ring 1528 when engaged by brush 1529 and the relay 1413 will also send negative current over the sixth segment of ring 1528 when engaged by the brush. This operation continues to interpolate impulses of alternate positive and negative polarities only when no signals are received from the cable, but when the fourth transmitted pulse is received, the current will rise to a sufficient amplitude to operate relay 1414 through its right hand winding. Relay 1414 will remain operated in its negative position for the duration of the fourth transmitted pulse and therefore storing relay 4 and monitor relay 1612 will each be receiving a negative pulse. The pulses thus regenerated by the vibrating relays are the same as those transmitted from station WT.

Ring 1528 of ring set 1500 is equipped with eighty segments, two segments for each impulse received from vibrating relays. The first segment of each pair is arranged to complete the operating circuits of one of the storing relays, while the second segment is utilized for closing a path to a monitor recorder, the segments of each pair being respectively connected in series with the vibrating relay. The monitor segments of channel A are connected to the left hand winding of monitor relay 1612 whereas the monitoring segments on the remaining seven of the channels are connected to separate oscillographs such as 1512 to 1518 inclusive. The operation of monitor relay 1612 causes a record on channel A to be set up on printer 1611 in a manner described above for printer 913 at station WR. The successive operation of the storing relays of set 1801 reproduces the impulses received from the vibrating relays for transmission over the sending ring set 1501 to outgoing conductors 1511 and 1912 to cable 1913. Ring set 1501 comprises two segmented rings 1532 and 1533 and continuous ring 1534 interengaged by a common brush 1535. The outgoing impulses are received over the ring set 1532 and impressed on both of rings 1533 and 1534. Ring 1534 is connected to the outgoing conductor 1511 and ring 1533 has its segments of each channel connected in separate multiples. The segments of channel A are connected to conductor 1536 through the left hand winding of monitor relay 1614, conductor 1617, inner left contact of cam 1711, conductor 1724 to the opposite side of either battery 1814 or 1815 depending on which happens to be connected to the armature of the particular storing relay connected to the segment engaged by brush 1535 at that time. The operations of relay 1614 cause the printer 1613 to record the outgoing signals on channel A in the same manner as described above for printer 926 at station WR.

The signals incoming at station ER, shown only in schematic in Figs. 1 and 2, are received in a manner similar to that described for station IR, but are retransmitted over two quad distributor ring sets instead of an eight channel distributor ring set just described. A description of the operation of the apparatus at station ER will be understood by making reference to the apparatus shown for station WR. This can be readily understood by assuming the signals incoming over cable 1013 at station WR when the apparatus thereat is set for east-west transmission. Therefore the incoming signals on conductor 1012 will be impressed through the lower contact of transfer relay 1011 on to shaping network and amplifier 1002. The signals in the output of the amplifier are impressed on vibrating relays 1016 and 1015 in the manner hereinbefore described and the signals herein reproduced together with those interpolated are impressed over two parallel circuits. One of these circuits is traceable from battery 1024 over armature and either contact of relay 1015, conductor 1021, contact of cam 715, conductor 770 through the windings of relay 1016, conductor 1022, through the right hand winding of any one of the storing relays of set 802 and the associated conductors of group 834 to the segments of ring 1212 of cable receiving set 1200. The other of these vibrating relay circuits is traceable from armature and either contact relay 1016 through the left hand winding of relay 1015, conductor 1023, through the right hand winding of cable monitor relay 930, conductor 949, segments of ring 1212 to ground conductor 1222. Ring 1212 consists of eighty segments arranged in pairs, one segment of each pair serving to complete the circuits through the storing relays and the other serving to complete the monitoring circuits. The monitoring circuit extends through the right hand winding of relay 930 only for signals incoming over channel A', whereas the signals incoming over the remaining channels flow from conductors 1023 and 1231 to the segments of ring 1212 connected in separate multiple, each multiple having separate oscillographs 1213 to 1219 inclusive.

The operation of relay 930 through the energization of its right hand winding causes the impulses received over channel A' to be recorded on printer 1223 in the same manner as those recorded on printer 926.

The impulses reproduced by storing relays of set 802 through the energization of their right hand windings are impressed on the segments of two quad sending distributor ring sets 1100 and 1101. These two ring sets each comprise two rings, one divided into quadrants of four equal segments, the other into twenty equal segments. The segments of one ring set are offset one half length with respect to those of the other ring set, and the impulses reproduced by each of the storing relays are transmitted over separate conductors of group 835 to the segments of ring sets 1100 and 1101, the current from storing relay No. 1 being received on segment No. 1 of ring set 1100, the current of storing relay No. 2 being received on segment No. 1 of ring set 1101, the current of storing relay No. 3 being received on segment No. 2 of ring set 1100, that of storing relay No. 4 being received on segment No. 2 of ring set 1101, that of storing relay No. 5 on segment No. 3 of ring set 1100, that of storing relay No. 1 on segment No. 3 of ring set 1101, and so on for the remaining pulses of channels A and E.

The signals received by the segments of ring set 1100 are distributed over a path extending through sending-on relay 1111 and the signals received by ring set 1101 are distributed over a path extending through the windings of relay 1112. In east-west transmission channels A' to H' inclusive, as stated hereinbefore, respectively correspond to A to H in west-east transmission and therefore the monitor relays 929 and 930 are shown connected to the channel A'. The impulses on relay 1111 flow through a circuit traceable over the upper outer contact of key 1132, conductor 1134, right hand winding of relay 929, conductor 950, contact of cam 716, to ground on cable 1014. The operations of relay 929 set up a printer record on printer 1226 in a manner hereinbefore described for printers 913. The monitor records on the remaining channels B', C' and D' inclusive, are obtained by oscillographs 1118, 1119 and 1120 respectively. The impulses received on ring set 1101 are impressed on the circuit extending through the winding of relay 1112, inner lower contact of key 1132, conductor 950, contact of cam 716 to ground at cable 1014. Monitor records on each of channels E' to H' inclusive of ring set 1101 are obtained by oscillographs 1121 to 1124 respectively.

Sending-on relays 1111 and 1112 operate in response to each of the impulses received from their windings and transmit the impulses so produced over conductors 1115 and 1116 to duplex lines 311 and 312 respectively. At station WT the impulses received over duplex line 311 are impressed on receiving relay 313 and those received over duplex line 311 are impressed on receiving relay 314. Relay 313 operates in response to these impulses and reproduces them in a circuit extending over conductor 353, contact of cam 414, conductor 426 to ring 316 of receiving ring set 300. The impulses flow over two parallel paths, one extending through ring 315, conductors 354, 355 to ground at cam 415, and the other extending over ring 317, through printers J to M over either of leads 356 or 357 to grounded battery. The monitor records on channels A to D at the terminal stations are, as stated above, obtained on oscillographs only, therefore the oscillographs 345 to 348 record the impulses received over channels A' to D' respectively. The recording, both printing and monitoring of the impulses reproduced by relay 314 is accomplished in the same manner as the impulses reproduced by relay 313. In accordance with the transmitted impulses of transmitters A and E, the first, second and fifth selector magnets of printer J' and the second and fifth selector magnets of printer N' together with their associated operating magnets, will operate.

*Conclusion.*—The foregoing description sets forth the relationship and cooperation of the elements making up the system in such a way as to clearly indicate their coordination in one complete individual whole.

What is claimed is:

1. A telegraph system comprising a plurality of terminal and repeating stations, a high speed transmission line connecting said repeating stations in series, a plurality of lower speed lines connecting each of said terminal stations to a repeating station, multichannel rotary distributors at each of said stations for transmitting signals over some of said lower speed lines and repeating said signals over said high speed line to the remainder of said lower speed lines at a steady rate of transmission time.

2. A telegraph system comprising a single line adapted to transmit signals over a plurality of channels, terminal and repeating stations, a plurality of other lines adapted to transmit signals over a lesser number of channels, said plurality of lines being connected to said single line at said repeating station, and common means at said repeating station for repeating signals from said single to said plurality of lines and vice versa.

3. A telegraph system comprising a plurality of terminal and repeating stations, a high speed transmission line connecting said repeating stations in series, a plurality of lower speed lines connecting each of said terminal stations to a repeating station characterized in this, that multi-channel rotary means are provided at each of said stations whereby signals transmitted over some of said lower speed lines are repeated over said high speed line to the remaining of said lower speed lines.

4. A telegraph system comprising a single line adapted to transmit signals over a plurality of channels, terminal and repeating stations, a plurality of other lines, each adapted to transmit signals over a lesser plurality of channels characterized in this, that common means are provided at said repeating station whereat the plurality of lines are connected to the single line, for repeating signals from said single line to said plurality of lines and vice versa.

5. In a telegraph system, a high speed signaling cable divided into sections, means for transmitting signals in opposite directions over said cable, and common means intermediate said cable sections for repeating signals in both directions.

6. A telegraph system comprising a high speed line terminating in and connected at each end to a plurality of low speed lines which divide the impulses carried by said high speed line, characterized in this that there is provided a combination of means for automatically reversing at predetermined intervals the direction of transmission over said lines with rotary distributors working through a common set of storing relays at each terminal point for repeating the impulses of the high speed line to the plurality of low speed lines and vice versa.

7. In a telegraph system, a high speed signaling cable divided into sections, a plurality of comparatively low speed duplex lines connected to said cable at each end, and common means for repeating signals in both directions between said duplex lines and said cable, and between said cable sections at a steady rate of transmission time.

8. In a telegraph system, a high speed signaling cable divided into sections, a plurality of comparatively low speed lines, terminal stations, repeating stations intermediate some of said low speed lines and said cable, intermediate said cable and the other of said low speed lines and intermediate said cable sections, a rotary distributor at each of said cable repeating stations arranged to operate over a plurality of channels, and a rotary distributor at each of said terminal stations to operate over a lesser plurality of channels.

9. In a telegraph system, a high speed multi-channel cable divided into sections and a plurality of comparatively low speed multi-channel lines connected to said cable at each end, a rotary distributor for connecting the cable at each end to said low speed lines, each of said distributors comprising two faces, one having a maximum of seven rings and the other having a maximum of ten rings, a rotary distributor for interconnecting adjacent cable sections, each of said distributors having two faces each of which have a maximum of seven rings.

10. In a telegraph system, a high speed multi-channel submarine cable divided into sections, a plurality of comparatively low speed multi-channel lines connected to said cable at each end, terminal stations, repeating stations interconnecting said lines and cable and interconnecting adjacent cable sections, means at each of said stations for reversing the direction of transmission at predetermined intervals, timing means at each of the repeating stations for operating the direction reversing means, said timing means at the repeating stations interconnecting said lines and cable being adapted to operate the direction control means at the terminal stations respectively adjacent to such repeating stations.

11. In a telegraph system adapted for simplex operation, a high speed multi-channel submarine cable divided into sections, a plurality of comparatively low speed lines connected to said cable at each end, terminal stations, repeating stations interconnecting said lines and cable and interconnecting adjacent cable sections, a rotary distributor at each of said stations for repeating signals, a motor for driving each of said distributors, direction control means, timing means and a distributor at each of said repeating stations for monitoring both incoming and outgoing signals transmitted in either direction, a motor for driving the direction control means, timing means and monitoring distributor at each repeating station, and a vibrating fork at each repeating station for driving the motors thereat at one speed.

12. In a telegraph system in accordance with claim 11, a monitoring distributor having a maximum of eight rings.

13. In a telegraph system according to claim 11, a continuous electrical correction means at each repeating station for correcting the distributors thereat to the signal impulses incoming from either direction, and a mechanical corrector at each terminal station for correcting the distributor thereat to an alternating current received from the adjacent repeating station.

14. In a telegraph system in accordance with claim 11, means for obtaining at each repeating station monitor printer records of both the incoming and outgoing signals on any one channel operating in either direction, and monitor wave records of both incoming and outgoing signals on the other channels.

15. In a telegraph system, a high speed multi-channel submarine cable divided into sections, repeating means interconnecting adjacent sections and each comprising a rotary distributor, means for repeating received signals and interpolating the signals lost in transmission, a pair of receiving rings on said distributor, a vacuum tube amplifier, a pair of vibrating relays connected in the output circuit of said amplifier, a set of storing relays responsive to one of said vibrating relays for repeating the received and interpolated signals, and monitoring devices responsive to the other of said vibrating relays for obtaining a printer record on one channel and oscillograph records on each of the remaining channels of signals both incoming and outgoing at the repeater point.

16. In a telegraph system, a high speed multi-channel submarine cable, a plurality of comparatively low speed multi-channel lines connected to said cable at each end, means at one connecting point for repeating the impulses of a channel on one line interleaved with those of a channel on another line, and means at the other connecting point for receiving the interleaved impulses and repeating them over two other of said lines in parallel in the order in which they were originally transmitted.

17. In a telegraph system, a high speed multi-channel submarine cable divided into sections, a plurality of comparatively low speed multi-channel lines connected to said cable at each end, repeating stations interconnecting said lines and cable and interconnecting adjacent sections, station terminating said low speed lines, a rotary distributor at each of said stations for repeating the signals, other rotary distributors at each of said cable stations for monitoring the signals, a pair of lamps at each of said cable stations for phasing the main distributor thereat with the incoming signals and a single lamp at each of said cable stations for phasing the monitor distributor thereat with its associated main distributor, and a maximum of three lamps at each of said terminating stations for phasing the distributor thereat in response to alternating current received from the adjacent cable station.

In witness whereof, we hereunto subscribe our names this 15th day of August, 1929.

ANDREW D. DOWD.
MARK B. KERR.
GEORGE A. LOCKE.